United States Patent
Takahara et al.

[11] Patent Number: 5,517,278
[45] Date of Patent: May 14, 1996

[54] VIEWFINDER FOR VIDEO CAMERAS

[75] Inventors: Hiroshi Takahara, Neyagawa; Hideki Ohmae, Suita; Yoshito Miyatake, Neyagawa, all of Japan

[73] Assignee: Matsushita Electric Industrial Co., Ltd., Osaka, Japan

[21] Appl. No.: 896,961

[22] Filed: Jun. 11, 1992

[30]     Foreign Application Priority Data

Jun. 12, 1991 [JP] Japan ................................ 3-139915
Jun. 12, 1991 [JP] Japan ................................ 3-139916
Jun. 12, 1991 [JP] Japan ................................ 3-139917
Jun. 12, 1991 [JP] Japan ................................ 3-139918
Jun. 12, 1991 [JP] Japan ................................ 3-139919

[51] Int. Cl.$^6$ ........................ G03B 17/18; G03B 13/02
[52] U.S. Cl. ................................ 354/471; 354/219
[58] Field of Search ........................ 354/471–475, 354/219, 76; 358/213.13, 231, 906, 909, 224, 475; 257/98; 359/51; 353/102, 84

[56]         References Cited

U.S. PATENT DOCUMENTS

| | | | |
|---|---|---|---|
| 4,142,786 | 3/1979 | Suzuki et al. | 354/471 |
| 5,092,672 | 3/1992 | Vanderwerf | 353/102 |
| 5,102,217 | 4/1992 | Takafuji et al. | 353/84 |
| 5,134,491 | 7/1992 | Muraji et al. | 358/231 |
| 5,161,025 | 11/1992 | Nakao | 358/906 X |
| 5,206,747 | 4/1993 | Wiley et al. | 359/51 |
| 5,286,408 | 2/1994 | Naemura et al. | 359/51 X |
| 5,299,289 | 3/1994 | Omae et al. | 359/51 X |
| 5,313,289 | 5/1994 | Nagane et al. | 358/475 |

FOREIGN PATENT DOCUMENTS 62-111233 5/1987 Japan .
1-120177 5/1989 Japan .

Primary Examiner—Michael L. Gellner
Assistant Examiner—Eddie C. Lee
Attorney, Agent, or Firm—Wenderoth, Lind & Ponack

[57]         ABSTRACT

A viewfinder suited for use in a video camera, wherein rays of light emitted at a large solid angle from a minute light emitting area of a light emitting element are converted by a condenser lens into a bundle of generally parallel rays of light having a narrow directionality before they enter a liquid crystal display. The liquid crystal display modulates the rays of light emerging from the condenser lens according to a video signal to effect an image display. The displayed image is magnified by a magnifying lens. The liquid crystal display is of a type wherein an optical image is formed as a function of a change in state of light scattering and may be a polymer dispersed liquid crystal display, a liquid crystal panel utilizing a dynamic scattering mode, a ferro-electric liquid crystal panel using a scattering mode or a display panel utilizing PLZT.

26 Claims, 11 Drawing Sheets

OFF

ON

VIEWFINDER FOR VIDEO CAMERAS

BACKGROUND OF INVENTION

1. Field of the Invention

The present invention relates to a viewfinder having an image display device, and also to a video camera utilizing the viewfinder.

2. Description of the Prior Art

A display device utilizing a liquid crystal display panel has been extensively studied and developed since it has some potential in that a further reduction in size and weight of the liquid crystal display device is possible as compared with a display device utilizing a cathode ray tube. In recent years. a liquid crystal display device using a twisted nematic (TN) mode in which the optical rotational polarization of liquid crystal molecules is utilized for an image display has been put to practical use and is currently used, for example, in a pocketable television set and a viewfinder in a video camera.

The details of a prior art viewfinder such as that disclosed, for example, in Japanese Laid-open Patent Publication No. 62-111233 is discussed below. It is to be noted that, in the instant specification, the term "viewfinder" is used to means an image display device of a type integrated with a light source such as, for example, a light emitting element, for illumination purpose.

In the prior art viewfinder, a tubular fluorescent lamp is utilized as a means for emitting light within the viewfinder. Where the liquid crystal display device has a display screen of about 1 inch in size, the fluorescent tube used therein is of a type having a diameter within the range of 2 to 5 mm. On the other hand, where the liquid crystal display device has a display screen of a size greater than 1 inch, more than one fluorescent tube is often used.

In either case, rays of light emitted from the light source travel in all directions radially outwardly therefrom and, in order to maximize the utilization of that portion of the rays of light which travel rearwardly from the light source, a generally concave reflector shade is disposed rearwardly of the light source to reflect the rays of light towards an .object to be illuminated that is positioned forwardly of the light source. A diffuser plate is also disposed between the light source and the TN liquid crystal panel for diffusing the incoming rays of light. A combination of the fluorescent light source with the diffuser plate constitutes a surface light source. The diffused rays of light, that is, the rays of light which have passed through the diffuser plate, are subsequently incident upon the liquid crystal display device to illuminate the latter so that an image displayed thereby can be viewable to the eye of a viewer looking into the viewfinder. As a matter of practice, the diffused rays of light travelling toward the liquid crystal display device have a cross section generally equal to or larger than the area of the surface of the display screen.

In the prior art viewfinder, a polarizing plate is disposed on each side of the TN liquid crystal panel forming the liquid crystal display device with respect to the direction of travel of the diffused rays of light. One of the polarizing plates that is positioned between the diffuser plate and the TN liquid crystal panel, hereinafter referred to as a polarizer, has a function of linearly polarizing the diffused rays of light, whereas the other polarizing plate that is positioned between the TN liquid crystal panel and the viewer's eye, hereinafter referred to as an analyzer, has a function of shielding the diffused rays of light according to the extent to which the incoming rays of light incident upon the TN liquid crystal panel are modulated. As is well known to those skilled in the art, the polarizer and the analyzer are are so arranged and so disposed that the direction of polarization of one of the polarizer and the analyzer can lie perpendicular to that of the other of the polarizer and the analyzer.

Thus, according to the prior art, the surface light source is constituted by at least one tubular fluorescent lamp and the diffuser plate. The diffused rays of light are, as they pass through the polarizer, converted into linearly polarized light, that is, light travelling in a wave formation along a straight path. This linearly polarized light is subsequently modulated by the TN liquid crystal display panel according to a video signal applied to the TN liquid crystal display panel and is then selectively intercepted and passed through the analyzer according to the modulation of the polarized light, so as to thereby effect a display of image information corresponding to the applied video signal. The use is often made of a magnifying lens disposed between the analyzer and the eye of the viewer to magnify the image information displayed.

The video camera, also known as a Camcorder, is generally required to be compact in size and light-weight in order for it to be portable and easy to handle. For this purpose. A liquid crystal display device is now often used as as a display element to be incorporated in the viewfinder. However, the liquid crystal display device currently designed for use in the viewfinder consumes a relatively large amount of electric power. By way of example, reports have been made that the viewfinder utilizing the prior art TN liquid crystal display device consumes about 1.1 watt, specifically about 0.1 watt by the display device and about 1.0 watt by the light source. In addition, in order for the video camera to have compact and portable features, a battery providing a source of electric power necessary to drive all electric circuits and motors used in the video camera has a limited capacity and, therefore, the higher the electric power consumption of the viewfinder, the shorter the length of time over which the video camera can be run continuously.

One of major causes of the consumption of a relatively high electric power by the prior art TN liquid crystal display device is discussed below. As is well known to those skilled in the art, the liquid display device utilizing the TN liquid crystal, that is, the TN liquid crystal display device, requires the use of the polarizing plates on respective sides of the TN liquid crystal panel with respect to the direction of travel of the light. These polarizing plates exhibit a composite light transmittance of about 30% which means that only about 30% of the incoming light passes through the TN liquid crystal display device including these polarizing plates. In other words, this 30% light transmittance means a 30% efficiency of utilization of the incoming light available to the TN liquid crystal display device.

In addition, an element that reduces the intensity of the incoming light available to the TN liquid crystal display device is the diffuser plate. As discussed above, a light box including at least one fluorescent lamp and the reflector shade is required to form a surface light source. This is accomplished by the use of the diffuser plate disposed between the TN liquid crystal display device and the fluorescent lamp. If the diffuser plate used is of a type having a relatively low light diffusing capability, a flickering of the fluorescent lamp tends to be noticeable, and therefore, the displayed image will be viewed in varying gradation accompanied by a reduction in image display quality. Therefore, it is a general practice to employ a diffuser plate having a relatively high light diffusing capability which, however, reduces the light transmittance of the diffuser plate to such an extent that the light source must have an increased light output to attain a required or desired luminance. This in turn brings about an increased electric power consumption.

SUMMARY OF THE INVENTION

The present invention has been developed with a view to substantially eliminating the above discussed problems and is intended to provide an improved compact, lightweight viewfinder which is operable at a relatively low electric power consumption.

It is another important object of the present invention to provide an improved video camera of a type utilizing the viewfinder referred to above.

To this end, the viewfinder of the present invention is so constructed as follows. Rays of light emitted from a minute light emitting area of the light emitting element at a large solid angle are converted by a condenser lens into a bundle of generally parallel rays of light having a narrow directionality which are subsequently incident on a liquid crystal display serving as a light modulater. The liquid crystal display modulates the rays of light emerging from the condenser lens in response to a video signal so as to thereby display an image. The image so displayed can be viewed on an enlarged scale by means of at least one magnifying lens disposed between the liquid crystal display and the viewer's eye. The liquid crystal display may be employed in the form of a polymer dispersed liquid crystal display operable to form an optical image as a function of variations of a state of light scattering.

The viewfinder embodying the present invention has a light source of a size smaller than that used in the prior art-viewfinder and, therefore, the amount of electric power consumed by the light source is extremely low as compared with the prior art viewfinder employing the light box in which a fluorescent tube is accommodated. Also, it is possible to reduce the size of the viewfinder as a whole. Where the polymer dispersed liquid crystal display is employed, no polarizing plate is necessary and the efficiency of utilization of rays of the light can be increased, accompanied by a further reduction in the amount of electric power consumed by the viewfinder.

Also, the light emitting element employed in the viewfinder of the present invention may be a light emitting tube, a cathode ray tube, a fluorescent light emitting element, or a light emitting diode. Regardless of the type of the light emitting element actually employed, the small light emitting area of the light emitting element can be realized by the use of a light shielding plate and the amount of light emitted can be adjusted electrically, mechanically, or electromagnetically.

When a light emitting diode is employed as the light emitting element, a light emitter of the light emitting diode may be molded in a synthetic resin while a surface of the molding resin from which rays of light emerge outwardly is utilized as a spherical lens. In such a case, if the rays of light emitted from the light emitter are allowed to satisfy an aplanatic condition, the rays of light incident from the light emitting diode upon the spherical lens can satisfy a sine condition and, therefore, the liquid crystal display device as viewed from the viewer can provide a uniform luminance.

BRIEF DESCRIPTION OF THE DRAWINGS

This and other objects and features of the present invention will become readily understood from the following description of preferred embodiments taken with reference to the accompanying drawings, in which like parts are designated by like reference numerals and in which.

DETAILED DESCRIPTION OF THE EMBODIMENTS

Figure 1:
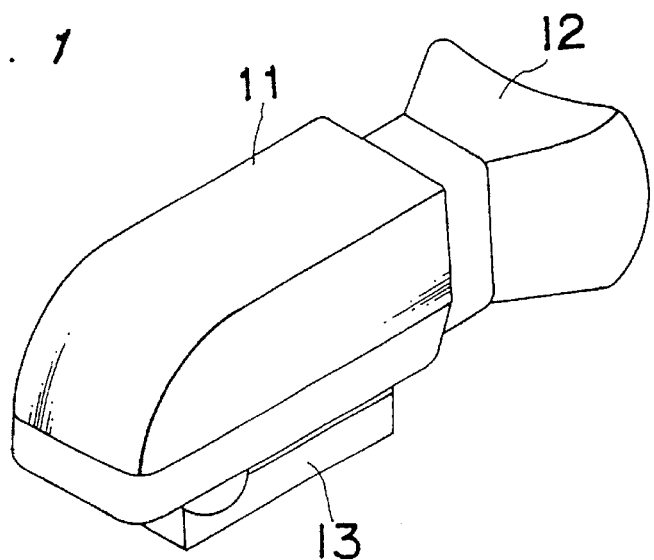
FIG. 1 is a perspective view of a viewfinder used on a video camera, showing a general outer appearance thereof.

Referring first to FIG. 1 showing an entire perspective of a viewfinder, reference numeral 11 represents a generally rectangular box-like housing; reference numeral 12 represents a flexible eye cup through which a viewer can view an image being reproduced on a viewfinder screen; and reference numeral 13 represents a mounting foot secured to a bottom of the viewfinder housing 11 for releaseable engagement with a hot shoe (not shown) installed atop the video camera body (not shown). The eye cup 12 shown therein is of a type designed to make it easy to fix the eye of the viewer in alignment with an eyepiece optical axis. It is to be noted that, in FIG. 2 through FIG. 11 pertaining to different embodiments of the present invention, the viewfinder is schematically shown in a longitudinal sectional representation to an extent necessary to understand the gist of the present invention and, therefore, known elements less pertinent to the present invention including the eye cup shown by 12 in FIG. 1 are not illustrated for the sake of brevity.

Figure 2:
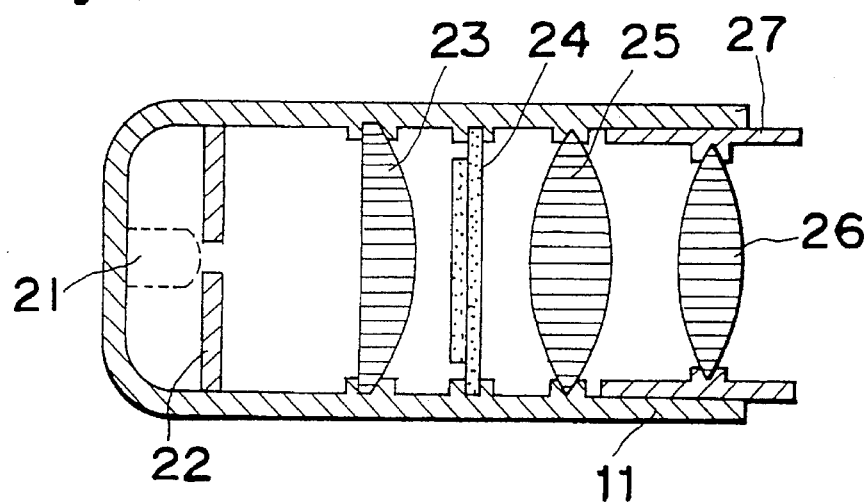
FIG. 2 is a longitudinal sectional view, on an enlarged scale, showing internal component parts of the viewfinder.

Referring now to FIG. 2 pertaining to a first preferred embodiment of the present invention, the viewfinder shown therein includes a light emitting element 21 a condenser lens 23, a liquid crystal display device 24 and a pair of juxtaposed magnifying lenses 25 and 26, all lined up in a coaxial relationship with each other. So far shown, the liquid display device 24 may be of a type having a rectangular display area of 28 mm in diagonal length, and the condenser lens 23 is employed in the form of a planoconvex lens and may have an effective diameter of 30 mm and a focal length of 15 mm. The light emitting element 21 is disposed at a position adjacent the focal point of the condenser lens 23 opposite to the liquid crystal display device 24 and confronts a plane surface of the condenser lens 23. As shown, one of the magnifying lenses, that is, the magnifying lens 25 is fixed in position inside the viewfinder housing 11, whereas the other of the magnifying lenses, that is, the magnifying lens 26 is mounted inside an eyepiece ring 22 supported in the viewfinder housing 11 for adjustment in a direction parallel to the optical axis of the viewfinder optics. Although not shown, the viewfinder housing 11 has its interior surface colored black or darkened to facilitate an absorption of unnecessary rays of light.

Positioned within the viewfinder housing 11 and between the light emitting element 21 and the condenser lens 23 is a light shielding plate 22 having a perforation P defined therein generally in alignment with the optical axis of the viewfinder optics. The light shielding plate 22 having the perforation P serves to reduce the area of surface through the rays of light from the light emitting element 21 are radiated outwardly towards the condenser lens 23. It is to be noted that, if the area of surface of the perforation P is relatively large, an image being displayed by the liquid crystal display device 24 can be illuminated brightly, but will show a reduced contrast. This is because, while the amount of light incident on the condenser lens 23 increases, the directionality of the incident light is lowered.

Accordingly, where the liquid crystal display device 24 is of a type having the 28 mm display screen referred to hereinbefore, the area of surface through which the light is radiated towards the condenser lens 23 should be chosen to be about 15 mm$^2$ or smaller and this corresponds to about 4 mm in diameter of the perforation P. A surface area of 10 mm$^2$ or smaller is preferred. However, if the diameter of the perforation P is too small, even a slight misalignment of the eye of the viewer looking in to the viewfinder results in an extreme darkening of the image being displayed and, accordingly, the surface area of the perforation P should be of a value not smaller than 2 mm$^2$. By way of example, it has been found that, with the perforation P being 3 mm in diameter, the luminance of the image being displayed could be comparable to or higher than that in the prior art viewfinder utilizing the surface light source and that, at that time, the contrast of the displayed image was 20 or higher.

It is to be noted that the above discussion made in connection with the surface area through which the rays of light are radiated towards the condenser lens 23 can equally apply to any of an aperture and a light shielding diaphragm which will be described in connection with the remaining embodiments of the present invention. In any case, that the diameter of the perforation or aperture should be thought to be within the range of 0.5 to 5 mm. However, the above mentioned diameter of the perforation or aperture applies where the display screen has a diagonal length of 28 mm. The longer the diagonal length of the display screen, the greater the diameter of the perforation or aperture. In terms of the ratio of the surface area of the display screen relative to the surface area through which the rays of light are radiated, it must be equal to or smaller than 20:1, preferably equal to or smaller than 40:1. However, considering the viewing angle, the ratio should be equal to or greater than 200:1.

The rays of light emitted at a solid angle from the light emitting element 21 are converted by the condenser lens 23 into a bundle of light rays generally parallel to each other and having a narrow directionality. The bundle of light rays subsequently enters a counter electrode (not shown) forming a part of the liquid crystal display device 24. The liquid crystal display device 24 is of a type containing a polymer dispersed liquid crystal. In response to a video signal applied to the liquid crystal display device 24, the light transmittance or the degree of scattering of the liquid crystal panel varies according to the video signal thereby so as to form an image corresponding to the video signal. The viewer can look the image being displayed through the eye cup 12 or the eyepiece ring 22 of the viewfinder. At this time, the position of the pupil of the viewer's eye is fixed relative to the viewfinder. Assuming that all picture elements of the liquid crystal display device 24 are in position to permit a passage of light therethrough, the condenser lens 23 allows all of the rays of light, emitted from the light emitting element 21 and subsequently passing through an effective area of the condenser lens 23, to be incident on the pupil of the viewer's eye after having passed through the magnifying lenses 25 and 26. Since a combination of the juxtaposed magnifying lenses 25 and 26 serves as a magnifier, the image being displayed by the liquid crystal display device 24 can be viewed on an enlarged scale.

Since as discussed above the position of the pupil of the viewer's eye is fixed relative to the viewfinder when the viewer's eye is in touch with the eye cup 12, the light source positioned behind the eye cup 12 may have a narrow directionality.

In the prior art viewfinder having the light box in which the fluorescent tube is used as the light source, only a portion of the rays of light travelling at a minute solid angle in all directions from an area of a size substantially equal to the screen size of the liquid crystal display device is utilized and no other portion thereof is utilized. In other words, the efficiency of utilization of the available rays of light is very low.

In contrast thereto, the present invention makes use of a minute light source of the light emitting element and the rays of light radiated at a great solid angle from the light emitting element are converted by the condenser lens 23 into a bundle of generally parallel rays of light. By so doing, the rays of light emerging from the condenser lens 23 has a narrow directionality. The narrow directionality of light can be, if the viewer's eye is fixed relative to the viewfinder, effectively utilized in the viewfinder. As a matter of fact, the smaller the light emitting element, the smaller the electric power consumption.

It is eventually pointed out that, in order for an image displayed by a pocketable television receiver set to be viewed satisfactorily, a definite viewing angle is required and, therefore, the light box employed in the pocketable television set is provided with a diffuser plate for diffusing rays of light which are eventually incident on the liquid crystal display device. However, in the case of the viewfinder or the like, the viewing angle may be small since the viewer's eye is generally fixed relative to the eyepiece or eye cup of the viewfinder. This means that the directionality of the rays of light incident on the liquid crystal display device employed in the viewfinder may suffice to be narrow and the viewfinder embodying the present invention makes best use of the manner taken by the viewer when the viewer looks into the viewfinder in fixed relationship to the eye cup.

If the condenser lens 23 has no aberration and 100% light transmittance, the luminance of the light emitting element viewed through the condenser lens is substantially equal to that of the light emitting element. Accordingly, assuming that the maximum light transmittance of the liquid crystal display device including a color filter, the polarizing plates and the vignetting factor of the image is 3%, the light transmittance of the condenser lens 23 is 90% and the luminance required by the viewfinder is 15 (ft-L), the luminance the light emitting element must have is about 560 (ft-L). The light emitting element satisfying this requirement includes a light emitting tube operable on a light emission principle such as, for example, a cathode ray tube and a fluorescent tube, a fluorescent light emitting element, a xenon lamp, a metal halide lamp, a tungsten lamp, a halogen lamp, a light emitting element capable of emitting light as a result of electron behaviors such as, for example, a light emitting diode (LED) and electroluminescence (EL), and a self light emitting element capable of emitting light as a result of discharge such as, for example, a plasma display panel (PDP). Of these various light emitting elements, the use of one of the cathode ray tube, the light emitting tube, the light emitting diode and the fluorescent light emitting element is considered optimum since they are small in size and operable at a low electric power consumption and capable of emitting white light.

In the practice of the present invention, the liquid crystal display device 24 may be in the form of a TN liquid crystal display device. However, the use of the liquid crystal display device utilizing the polymer dispersed liquid crystal is effective to accomplish a display of high luminance. The liquid crystal display device utilizing the polymer dispersed liquid crystal does not require the use of the polarizing plates. Considering that the composite light transmittance exhibited by a combination of the polarizer and the analyzer both used in the TN liquid crystal display device is about 30%, the liquid crystal display device utilizing the polymer dispersed liquid crystal is effective to accomplish the display at a luminance which is about three times that accomplished by the TN liquid crystal display device.

In view of the foregoing, the use is preferred of a control device for controlling the scattering and the transmission of light in a light modulating device employed in the viewfinder optics according to the present invention. While one example thereof is the liquid crystal display device utilizing the polymer dispersed liquid crystal, the it may not be limited thereto. By way of example, a device capable of scattering and transmitting rays of light which can be employed in the practice of the present invention as the light modulating device includes, for example, a liquid crystal panel utilizing a dynamic scattering mode (DSM), a ferroelectric liquid crystal panel operable under a scattering mode and a display panel utilizing PLZT.

A drive circuit for driving the liquid crystal display device is described below. It is, however, to be noted that, since the viewfinder embodying the present invention is designed to provide a high contrast image display, the liquid crystal display device is of a type driven on an active matrix drive scheme. Accordingly, FIG. 19 illustrates an equivalent circuit diagram of the active matrix liquid crystal panel.

Figure 19:
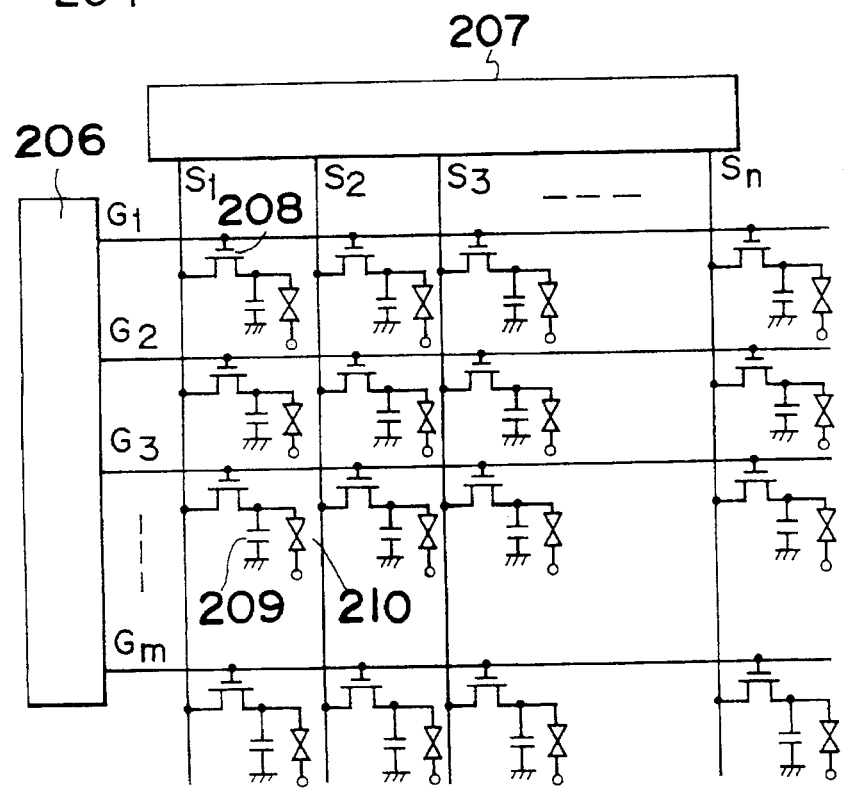
FIG. 19 is an equivalent circuit diagram showing an active matrix drive liquid crystal display panel.

Referring to FIG. 19, reference characters G1 to Gm represent respective gate signal lines each having one end electrically connected to a gate drive IC 206. The gate drive IC 206 is operable to selectively output one at a time ON and OFF voltages necessary to bring thin-film transistors 208, serving as a switching element, into conductive and non-conductive states, respectively. Reference characters S1 to Sm represent respective source signal lines connected at one end to a source drive IC 207. The thin-film transistors 208 are electrically connected to pixel electrodes cooperating with the counter electrode with a layer of polymer dispersed liquid crystal 210 intervening between the pixel electrodes and the counter electrode. The thin-film transistors 208 are also connected at one end with capacitors 209 each serving as a charge accumulating element.

Figure 20:
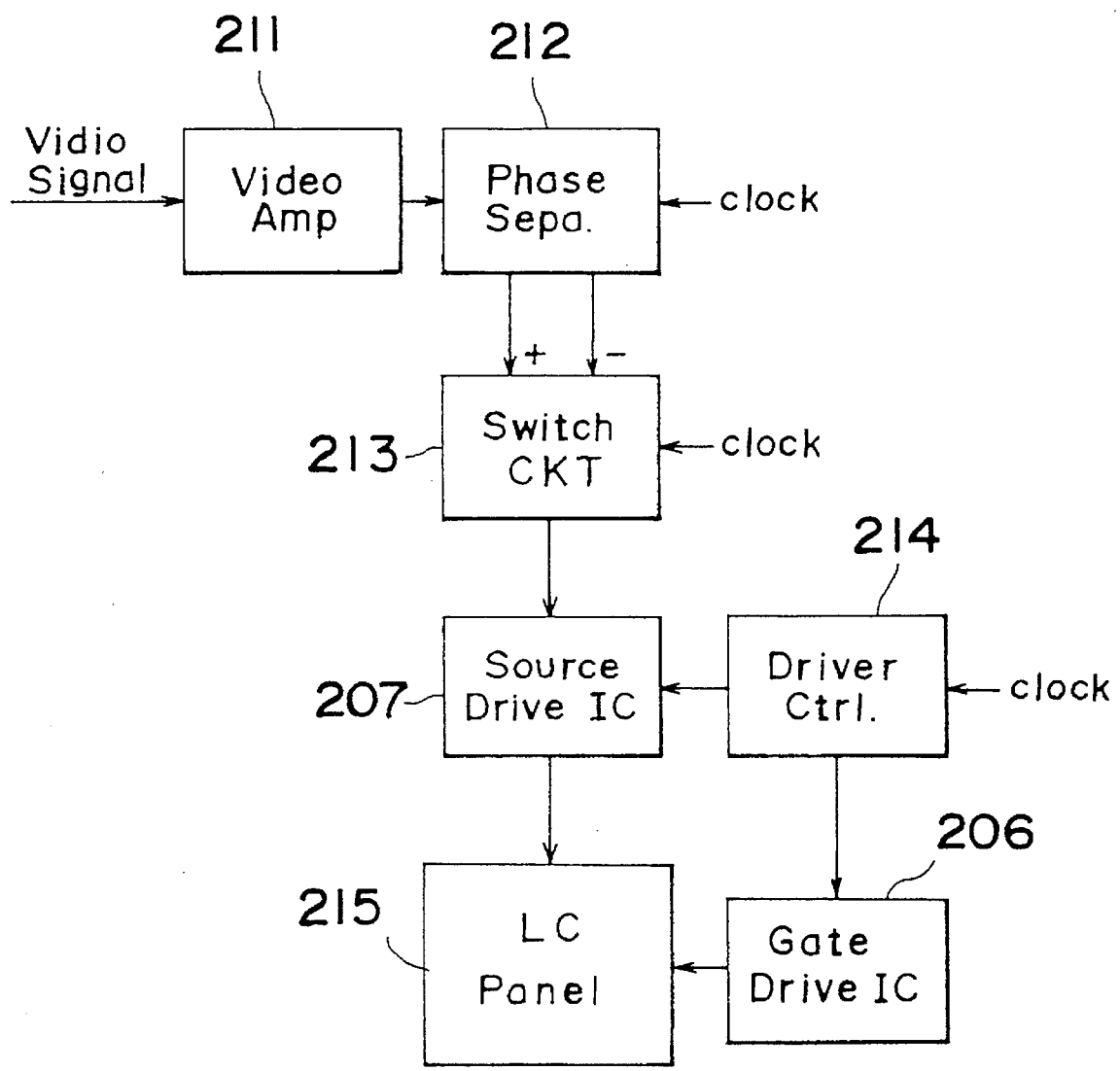
FIG. 20 is a circuit block diagram showing a signal processing circuit for the liquid crystal display device.

FIG. 20 illustrates a block diagram of a signal processing circuit for the liquid crystal display device employed in the practice of the present invention. In FIG. 20, reference numeral 211 represents a video amplifier operable to amplify a video signal to a predetermined value; reference numeral 212 represents a phase separating circuit for providing respective video signals of positive and negative polarities; reference numeral 218 represents an output switching circuit for outputting an AC video signal having its polarity reversed for each field; reference numeral 215 represents the liquid crystal display panel; and reference numeral 214 represents a drive control circuit for synchronizing and controlling the source drive IC 207 and the gate drive IC 206.

The signal processing circuit shown in FIG. 20 operates in the following manner. Assuming that the video signal is supplied to the video amplifier 211, a gain adjustment is carried out by the video amplifier 211 so that the video signal amplified by the video amplifier 211 can match with electro-optical characteristics of the liquid crystal. The gain adjusted video signal is subsequently supplied to the phase separating circuit 212 by which two video signals of positive and negative polarities, respectively, can be synthesized. The output switching circuit 213, in response to receipt of the negative and positive video signals from the phase separating circuit 212, outputs a video signal having its polarity reversed for each field. The reversion of the polarity of the signal for each field is for the purpose of avoiding any possible deterioration of the liquid crystal by applying the alternating voltage thereto. Then, the video signal emerging from the output switching circuit 213 is inputted to the source drive IC 207. The source drive IC 207 performs, in response to a control signal from the drive control circuit 214, a signal processing including a level shift and sample holding of the video signal and applies a predetermined voltage to the source signal lines of the liquid crystal display panel 215 in a synchronized fashion with the gate drive IC 206.

In the event that the ON voltage is applied to the gate signal lines, the thin-film transistors connected respectively with the gate signal lines are brought into the conductive state to allow the video signal, then outputted to the source signal lines, to be applied to the associated pixel electrodes. On the other hand, when the OFF voltage is applied to the gate signal lines, the thin-film transistors are brought into the non-conductive state so that the signal then applied to the pixel electrodes can be retained for a length of time corresponding to a one-field period. In the case of the polymer dispersed liquid crystal, a higher driving voltage is required than that in the TN liquid crystal and, therefore, a voltage of maximum of about ±6.5 volt must be applied to the liquid crystal.

Hereinafter, the polymer dispersed liquid crystal will be described. The polymer dispersed liquid crystal can be classified into two types depending on the pattern of dispersion of liquid crystal molecules and polymer molecules: One is the type in which droplets of liquid crystal are dispersed in polymer, and the other is the type in which the liquid crystal exists in the polymer discontinuously. Hereinafter, the polymer dispersed liquid crystal will be referred to as a PDLC and the liquid crystal panel utilizing a PDLC is also referred to as a PN liquid crystal panel. In order for the liquid crystal panel of any one of the above discussed types to achieve an image display, the scattering and transmission of the incoming light have to be controlled.

A PDLC makes use of an aligned property of the liquid crystal in which the index of refraction varies with orientation of the 11quid crystal. Accordingly, in the absence of the voltage applied, the liquid crystal droplets are oriented irregularly. In this condition a difference in index of refraction occurs between the polymer and the liquid crystal, causing the incoming light to scatter. A subsequent application of the voltage results in an uniform orientation of the liquid crystal droplets. If the index of refraction of the liquid crystal when the liquid crystal droplets are oriented in a predetermined direction is chosen to match with that of the polymer, the incoming light can pass through the liquid crystal panel without being scattered.

In contrast thereto, a PNLC makes use of an irregularity in orientation of the liquid crystal molecules. The irregular orientation, that is, the absence of the applied voltage, allows the incoming light to be scattered. On the other hand, when the liquid crystal molecules are oriented regularly by the application of the voltage, the incoming light can pass through the liquid crystal panel.

While the present invention is not intended to use one of the PD liquid crystal panel and the PN liquid crystal panel, reference will be made to the PD liquid crystal panel in further discussing the present invention for the sake of brevity. Also, both the PDLC and PNLC are referred to as the polymer dispersed liquid crystal collectively and, hence, both the PD liquid crystal panel and the PN liquid crystal panel are referred to as the polymer dispersed liquid crystal panel collectively. Again, the liquid crystal dispersed in droplet form in a layer of polymer dispersed liquid crystal is referred to as droplet liquid crystal, and a resin component surrounding each droplet of liquid crystal is referred to as polymer.

Figure 12A:
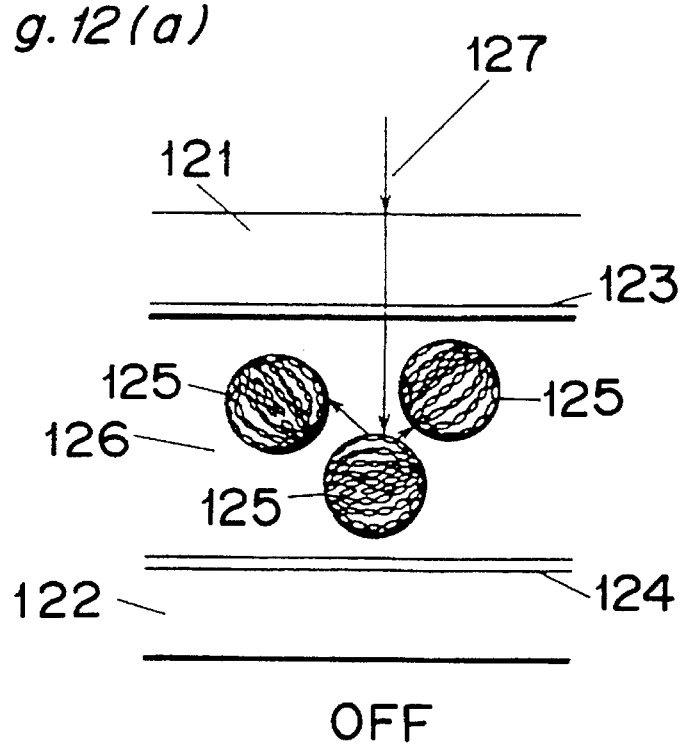
FIGS. 12(a) and 12(b) are schematic diagrams showing different behaviors of liquid crystal material used in the liquid crystal display device employed in the viewfinder embodying the present invention.

The behavior of the polymer dispersed liquid crystal will now be briefly described with reference to FIGS. 12(a) and 12(b). In FIG. 12(aand 12(b), reference numeral 122 represents an array substrate; reference numeral 124 represents a pixel electrode; reference numeral 123 represents a counter electrode; reference numeral 125 represents liquid crystal droplets; reference numeral 126 represents a polymer; and reference numeral 121 represents a counter electrode substrate. The pixel electrode 124 is connected to the thin-film transistor (not shown) and the selective switching of the thin-film transistor on and off results in an application of the voltage to the pixel electrode 124 so as to thereby change the orientation of the liquid crystal aligned with the pixel electrode to modulate the incoming light. FIG. 12(a) illustrates a condition in which no voltage is applied and, in this condition, the molecules of the liquid crystal droplets 125 are oriented irregularly. As a matter of fact, a difference occurs between the index of refraction of the polymer 126 and the liquid crystal droplets 125, causing the incoming light to be scattered.

Figure 12B:
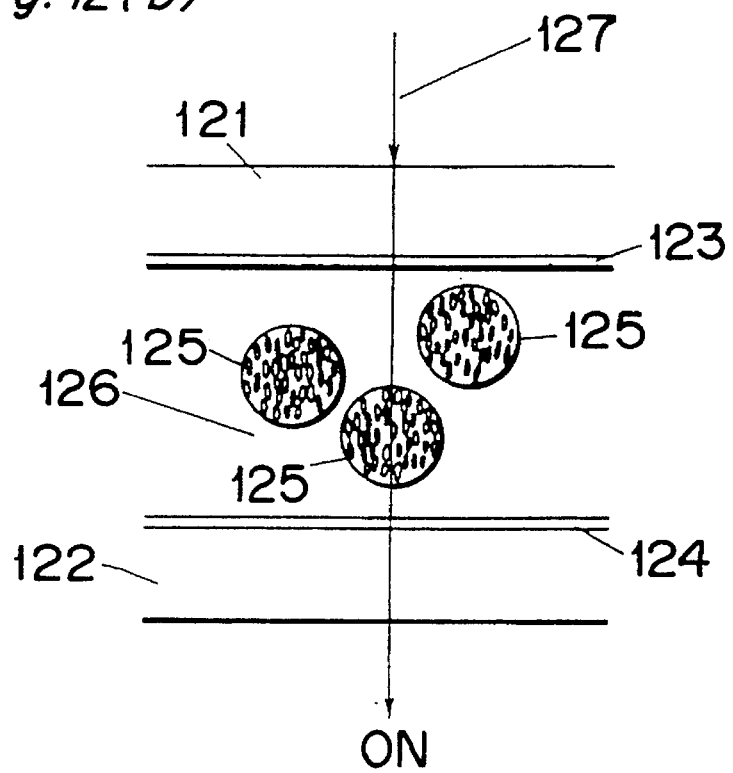

On the other hand, when the voltage is applied to the pixel electrode 124, the molecules of the liquid crystal droplets 125 are oriented regularly in a predetermined direction as shown in FIG. 12(b). If the index of refraction exhibited by the liquid crystal when the liquid crystal molecules are oriented in the predetermined direction as shown in FIG. 12(b) is chosen to match with that of the polymer 126, the incoming light can emerge outwardly from the array substrate 122 without being scattered.

A liquid crystal material for the polymer dispersed liquid crystal employed in the polymer dispersed liquid crystal display may be nematic liquid crystal, smectic liquid crystal or cholesteric liquid crystal, a mixture of two or more of these liquid crystal compositions, or a combination of one or more of the liquid crystal compositions with a substance other than a liquid crystal composition. Of them, the use of the nematic liquid crystal of cyanobiphenyl having a relatively large difference between the index of refraction n. of the extraordinary ray and that n. of the ordinary ray is preferred. A polymer matrix material may be a transparent polymer which may be either thermoplastic resin or light-curable resin, but the use of a UV-curable resin polymer is preferred because of its ease to manufacture and a better separation relative to the liquid crystal layer. A specific example of the UV-curable resin include a UV-curable acrylic resin, for example, acrylic monomer and acrylic oligomer which can be cured by polymerization when exposed to the ultra-violet rays of light.

Such a polymer forming monomer includes, for example, 2-ethylhexyl acrylate, 2-hydroxyethyl acrylate, neopentyl glycol acrylate, hexanediol diacrylate, diethylene glycol diacrylate, tripropylene glycol diacrylate, polyethylene gylcol diacrylate, trimethylol propane triacrylate, pentaerythritol acrylate, and so on.

An oligomer or prepolymer may include polyester acrylate, epoxy acrylate, polyurethane acrylate, and so on.

A polymerization initiator may be employed for accelerating the polymerization. Examples of the polymerization initiator employable include 2-hydroxy-2-methyl-1-phenyl propane-1-on ("DAROCURE 1173" available from Merk & Corp. Inc.), 1-(4-isopropylphenyl)-2-hydroxy-2-methyl propane-1-on ("DAROCURE 1116" avallable from Merk & Corp. Inc.), 1-hydroxy cyclohexyl phenylketone ("IRGACURE 651" available from Ciba-Geigy AG), and so on. If desired, a chain transfer agent, a photosensitizer, dye agent, crosslinking agent or the like may be appropriately applied as an arbitrary component.

The proportion of the liquid crystal material in the polymer dispersed liquid crystal is not specifically limited, but may be generally within the range of 20 to 95 wt %, preferably within the range of 50 to 85 wt %. If the amount of the liquid crystal material contained in the polymer dispersed liquid crystal is smaller than 20 wt %, the amount of the liquid crystal droplets will be too small to accomplish a satisfactory light scattering. Also, if it is smaller than 90 wt %, the polymer and the liquid crystal tend to separate from each other forming respective layers one above the other, accompanied by a reduction in proportion of the interface between the liquid crystal and the polymer to such an extent as to result in a light scattering characteristic. The structure of the polymer dispersed liquid crystal layer varies with change in proportion of the liquid crystal and, if it is smaller than about 50 wt %, the liquid crystal exists in the form of independent droplets, but if it is greater than 50 wt %, the polymer and the liquid crystal may mix together to form a continuous layer.

Preferably, the liquid crystal 15 has a film thickness within the range of 5 to 30 μm and, preferably, within the range of 10 to 15 μm. If the film thickness is small, the scattering characteristic will be reduced with a consequent reduction in contrast. Conversely if the film thickness is great, a high voltage drive will be required, making it difficult to design a drive IC for driving the liquid crystal and also to minimize the amount of electric power consumed by the drive IC.

The liquid crystal droplets must have an average particle size within the range of 0.5 to 3.0 μm and, preferably within the range of 1.5 to 2.5 μm, or the light scattering characteristic will be lowered accompanied by a reduction in contrast. In the case of the liquid crystal may be considered as classified to a particle type such as, for example, a PNLC, a diameter of the polymer, that is, a diameter of a polymer network, corresponds to the particle size referred to above.

In the polymer dispersed liquid crystal display device, the degree of light scattering exhibited by the pixels varies when the voltage is applied to such pixels. This light scattering degree is maximum when no voltage is applied to the pixels, but will decrease with an increase of the voltage applied. When a bundle of rays of light having a narrow directionality is caused to be incident on the liquid crystal display device 24, and when the light scattering degree is varied, the amount of light incident on the viewer's eye from the pixel varies. In other words, the lumiance of such pixel as viewed by the viewer varies and this phenomenon is utilized to effect the image display.

The liquid crystal display device 24 has a mosaic patterned color filter (not shown) fitted thereto. A pixel arrangement is a delta arrangement with about 55,000 pixels being employed. The color filter permits a passage therethrough of rays of light in any one of red, green and blue colors. Depending on the composition of the color filter, the film thickness in each color may be controlled. The color filter has a film thickness adjusted during the preparation thereof. In other words, the film thickness of the color filter varies with red, green and blue colors. The film thickness of the liquid crystal aligned with the respective pixel can be adjusted according to the individual color due to the varying film thickness of the color filter. In particular, the polymer dispersed liquid crystal display device tends to exhibit an inferior light scattering characteristic with respect to rays of light of long wavelength (red light) and, accordingly, if the film thickness of the liquid crystal corresponding to the red pixel is chosen to be greater than that corresponding to any one of the green and blue pixels, the scattering characteristic can be improved and a satisfactory gradation can be obtained among the red, green and blue colors.

Figure 6:
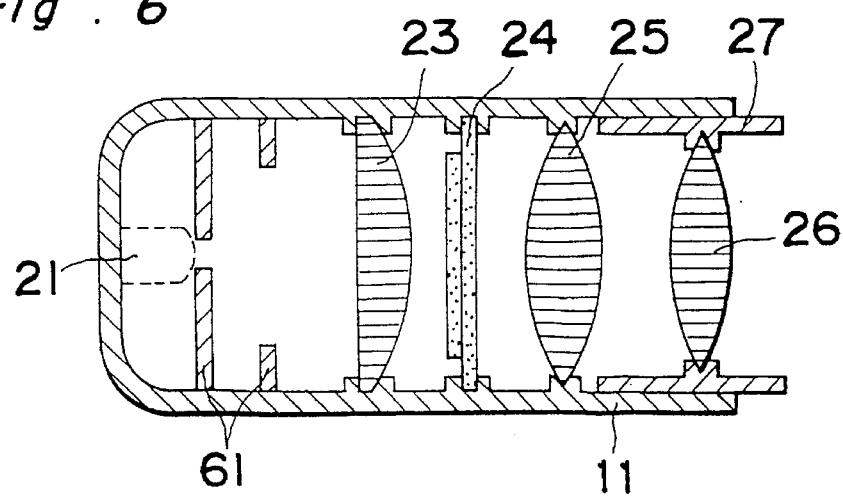

While a portion of the rays of light emerging from the liquid crystal display device 24 enters the pupil of the viewer's eye, the remaining rays of light forms a stray light which may constitute a cause of reduction in contrast of the image being displayed. In order to obviate this problem, apertures 61 may be interposed between the light emitting element 21 and the condenser lens 23 as shown in FIG. 6. Each of the apertures 61 has a round window defined at a central portion thereof and includes a plurality of apertures arranged in cocentrical relationship while spaced a predetermined distance from each other. The apertures serve to allow a passage therethrough of only the rays of light, emitted from the light emitting element 21, directly incident on the effective area of the condenser lens 23. Also, the interior wall surface of the viewfinder housing 11 and the eyepiece ring 27 is coated black or dark-colored to minimize the reflection of light. Of the rays of light emitted from the light emitting element 21, an unnecessary portion thereof can be absorbed by a light shielding portion of the apertures 61 and a portion of the rays of light which is not absorbed and slightly reflects can be absorbed by a light shielding portion of the other aperture and also by the interior wall surface of the viewfinder housing 11 and will not enter the condenser lens 23. Accordingly, any possible reduction in contrast of the image being displayed resulting from an entry of the unnecessary rays of light into the liquid crystal display device 24 can be extremely minimized. While the number of the apertures may not be limited to two such as shown, a single aperture may be employed. However, the larger the number of the apertures, the higher the contrast of the displayed image.

The condenser lens 23 is so positioned with its flat surface, that is, a surface of a greater radius of curvature, oriented towards the light emitting element 21. This arrangement render it to be easy to satisfy a sine condition thereby to equalize the luminance of the image being displayed by the liquid crystal display device 24. It is, however, to be noted that the condenser lens 23 may not be always limited to the plano-convex lens, but may be employed in the form of an ordinary positive lens.

An axial adjustment of the eyepiece ring 27 within the viewfinder housing 11 allows an focus adjustment to suit to the viewer's eyesight. It is to be noted that, if the liquid crystal panel has a screen size of 30 mm in diagonal length, the selection of the ares of surface, through which the rays of light are radiated, to about 8 $mm^2$, allows the viewer to look the displayed image properly even though the position of the viewer's eye relative to the viewfinder may displace slightly. It is also to be noted that, since the position of the viewer's eye is fixed when held in contact with the eye cup 12, a displacement of the position of the viewer's eye relative to the viewfinder seldom occurs. In any event, if the position of the viewer's eye is fixed relative to the viewfinder, the viewer can look the satisfactorily displayed image properly even though the directionality of the light is narrow.

In order for the displayed image to be more properly viewed, the direction in which the rays of light emitted from the light emitting element 21 may be shifted in an appropriate direction. For this purpose, although not shown, the use may be made of a position adjusting mechanism by which the light emitting element 21 can be slightly moved in a direction parallel to the optical axis of the viewfinder optics and/or in a direction perpendicular to the optical axis.

Figure 4:
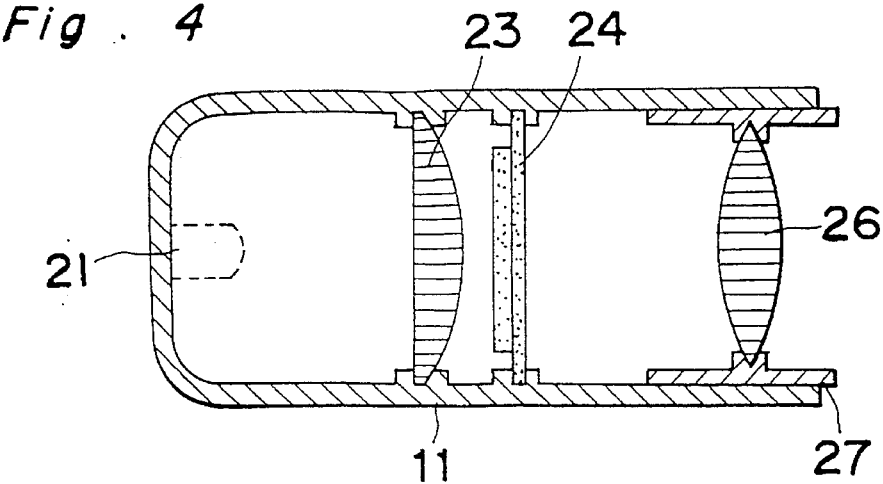

Although the structure shown in FIG. 2 utilizes the positive lens 25, it may not be always necessary and may be dispensed with as shown in FIG. 4. In such case, although an axial movement of the eyepiece ring 27 can result in a magnification of the image being displayed to a certain extent, it should pose no problem. As a matter of course, the viewfinder optics can be adjusted to the eyesight of the viewer by moving the eyepiece ring 27. It is also clear that, where the light emitting area of the light emitting element 21 is designed to be small, the aperture 22 may be dispensed with.

Figure 3:
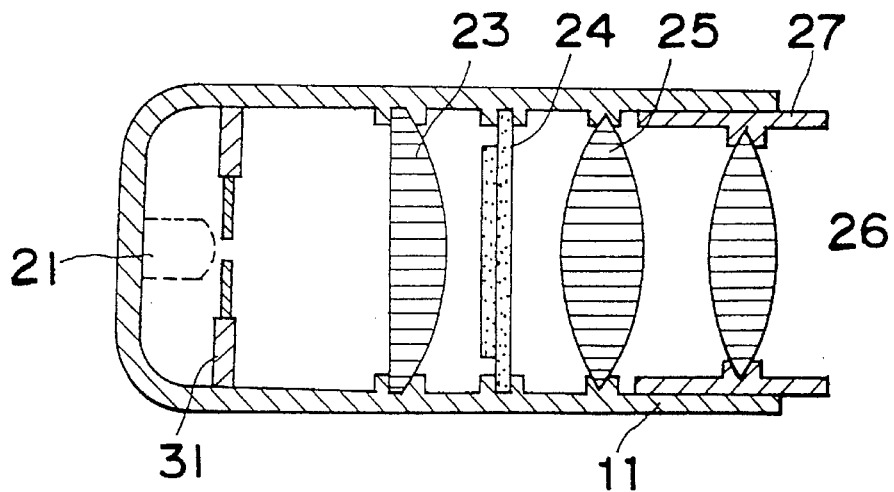
FIGS. 3 to 11 are views similar to FIG. 2, showing various modified forms of the viewfinder.

Also, as shown in FIG. 3, the perforation P of an aperture 81 may have an adjustable diameter. In such case, the aperture 31 may be of a type generally employed in a photographic lens assembly or a photographic camera, and an adjustment of the diameter of the perforation of the aperture 31 may be made by means of a lever exposed to the outside of the viewfinder housing 11 for access to the viewer's finger so that a rotation of the lever can result in an adjustment of the diameter of the perforation P. In this case, care must be taken that the center of the aperture 31 must coincide with the optical axis of the condenser lens 13. Thus, when the size of the aperture 31 is varied, the light emitting area of the light emitting element 21 correspondingly varies accompanied by a subsequent change in directionality of the rays of light emerging from the condenser lens 23 and, therefore, the contrast of the image being displayed by the liquid crystal display device 24 can be adjusted. The viewing angle can also be adjusted. Thus, the viewer can, while looking at the image being displayed, adjust the lever to a proper position at which an optimum condition of the displayed image can be obtained.

With the viewfinder according to the present invention as hereinabove described, the rays of light radiated at a relatively large solid angle from a small light emitting body of the light emitting element 21 are efficiently condensed by the condenser lens 23 and, accordingly, as compared with the viewfinder in which the back lighting of the surface light source utilizing the fluorescent tube, the amount of the electric power consumed can be considerably reduced.

While the liquid crystal display device 24 can give a high luminance of the displayed image and also can consume a reduced amount of electric power, provided that the polymer dispersed liquid crystal display device is employed, as a matter of course it can employ the TN liquid crystal display device. In such case, the polarizing plates must be disposed on respective sides of the TN liquid crystal display device. Due to a loss in transmittance resulting from the use of the two polarizing plates, to secure a necessary luminance requires an increased output of the light source, as compared with the case in which the polymer dispersed liquid crystal display device is employed, and the amount of the electric power consumed will increase in proportion to the increase in output. However, since the light emitting body of the light source may suffice to be small, the amount of the electric power consumed can be reduced as compared with the prior art viewfinder in which the backlighting is employed. It is to be noted that the TN liquid crystal display device includes a liquid crystal display device utilizing a super twisted nematic (STN) mode in which the twisting angle of liquid crystal molecules is equal to or greater than 90 degrees. Furthermore, for the liquid crystal display device, the one utilizing ferro-electric liquid crystal is utilized may be employed.

Figure 5:
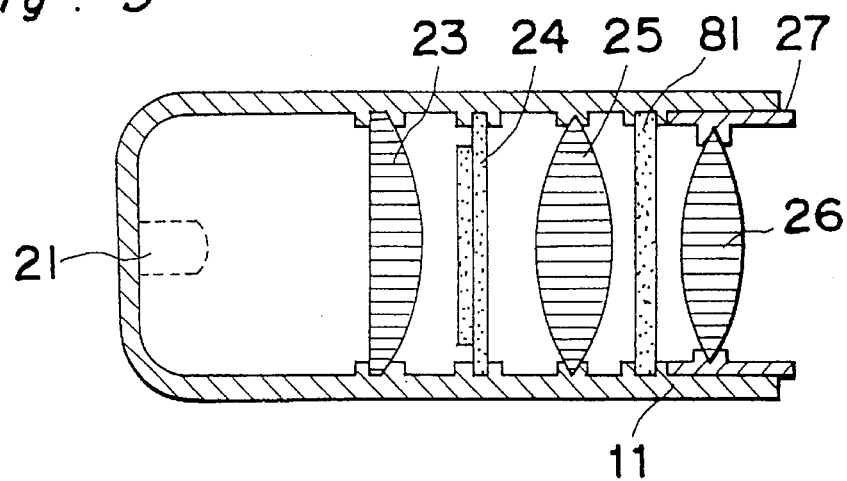

The liquid crystal display device 24 is usually provided with a black matrix (not shown). The black matrix is used to hide a motion of the liquid crystal on the signal lines of the liquid crystal display device 24 and also to shield rays of light incident on the thin-film transistors capable of switching the pixels. However, where the number of the pixels used in the liquid crystal display device 24 is small, the black matrix will be noticeable to such an extent that the quality of the image may be reduced. If, however, a diffraction grating is interposed between the viewer's eye. and the liquid crystal display device 24 as an optical low pass filter, the conspicuousness of the black matrix can be suppressed. The structure designed for this purpose is shown in FIG. 5.

The diffraction grating 81 may be disposed between the two positive lenses 25 and 26, at a position adjacent one of the opposite surfaces of the positive lens 26 which confronts the liquid crystal display device 24 or at a position adjacent one of the opposite surfaces of the liquid crystal display device 24 which confronts the positive lens 25. However, the diffraction grating 81 must have a pitch and a height which should be varied depending on the position at which the diffraction grating 81 is actually installed within the viewfinder housing 11. In any event, the diffraction grating 81 is effective to suppress the conspicuousness of the black matrix and, therefore, the viewer can look the image that is smoothly displayed without being disturbed by the presence of the black matrix.

The diffraction grating 81 used in the practice of the present invention is of a type capable of passing rays of light therethrough and may have a cross-sectional shape similar to a sine curve, a meniscus or a trapezoidal shape. The diffraction grating 81 may have a pattern either two-dimensional or three-dimensional. The pitch may be within the range of 100 to 20 μm if the liquid crystal display device 24 has a pixel of 100 to 30 μm in size and the diffraction grating 81 is disposed adjacent this liquid crystal display device 24, but within the range of 2 to 0.1 mm if the diffraction grating 81 is disposed adjacent the magnifying lens. The diffraction grating 81 may be prepared by means of a patterning method wherein an inorganic substance such as $SiO_2$ is vapor deposited on a glass substrate or a spin-coating method wherein a mixture of polymer with dopant is spin-coated on a glass substrate and is then exposed to light through a patterned mask, followed by heating under reduced pressure to sublimate the dopant.

Figure 7:
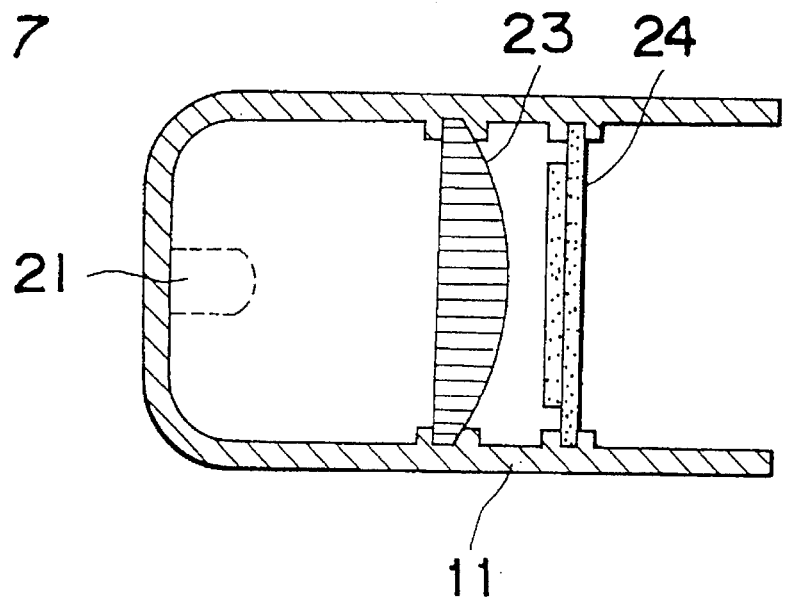

According to the present invention, the use of the positive lenses 25 and 26 is not always essential and may be dispensed with as shown in FIG. 7. In such case, since no magnifying lens is employed in the structure of FIG. 7, the image displayed by the liquid crystal display device 24 can be viewed on a real scale and this should pose no problem in practice.

Figure 8:
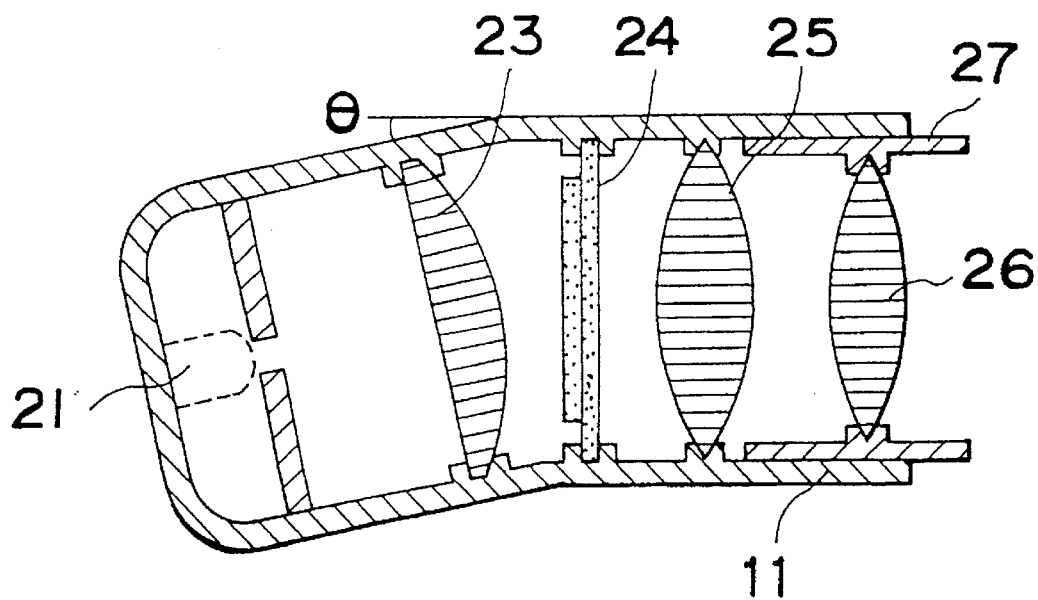

FIG. 8 illustrates a further modified form of the viewfinder according to the present invention, wherein the viewfinder housing 11 includes a rear housing portion accommodating therein the light emitting element 21 and the condenser lens 23, and a front housing portion accommodating therein the liquid crystal display device 24 and the positive lenses 25 and 26. The rear housing portion is inclined at an predetermined angle θ relative to the front housing portion so that the rays of light emitted from the light emitting element 21 and emerging outwardly from the condenser lens 23 can enter the liquid crystal display device 24 slantwise. It is to be noted that the normal to the liquid crystal display device 24 is aligned with the optical axis of the magnifying lens 25. The angle θ of inclination of the rear housing portion relative to the front housing portion may vary with a light scattering characteristic of the liquid crystal display device 24, but may be chosen to be within the range of 3 to 20 degrees and, preferably, within the range of 4 to 15 degrees. It is to be also to be noted that the viewfinder housing may be constructed such that the rear housing portion can bend relative to the front housing portion at the will of the viewer with the angle θ of inclination being adjustable.

With the viewfinder according to any one of FIGS. 2 to 7, the rays of light passing straight through the liquid crystal display device 24 can be recognized as carrying the image being displayed. However, with the viewfinder shown in FIG. 8, the rays of light scattered at the liquid crystal display device 24 and travelling slantwise can be recognized as carrying the image being displayed. In other words, the former provides a representation of the positive image while the latter provides a representation of the negative image. In order to convert the negative image being displayed into the positive image, it suffices to reverse the polarity of the video signal to be applied to the liquid crystal display device 24 with the use of a reversion amplifier.

In the polymer dispersed liquid crystal display device, the ratio of the rays of light having passed through the liquid Crystal display device 24 during an ON state thereof relative to the rays of light scattered therefrom during an OFF state thereof is referred to as a contrast. As shown in FIG. 8, where the light emitting element 21, the condenser lens 23 and the liquid crystal display device 24 are all aligned with the position of the viewer's eye while collimated rays of light are allowed to be incident on the liquid crystal display device 24, the amount of the rays of light having passed through the liquid crystal display device 24 during the ON state thereof is relatively larger than that of the scattered rays of light during the OFF state of the liquid crystal display device 24.

Figure 9:
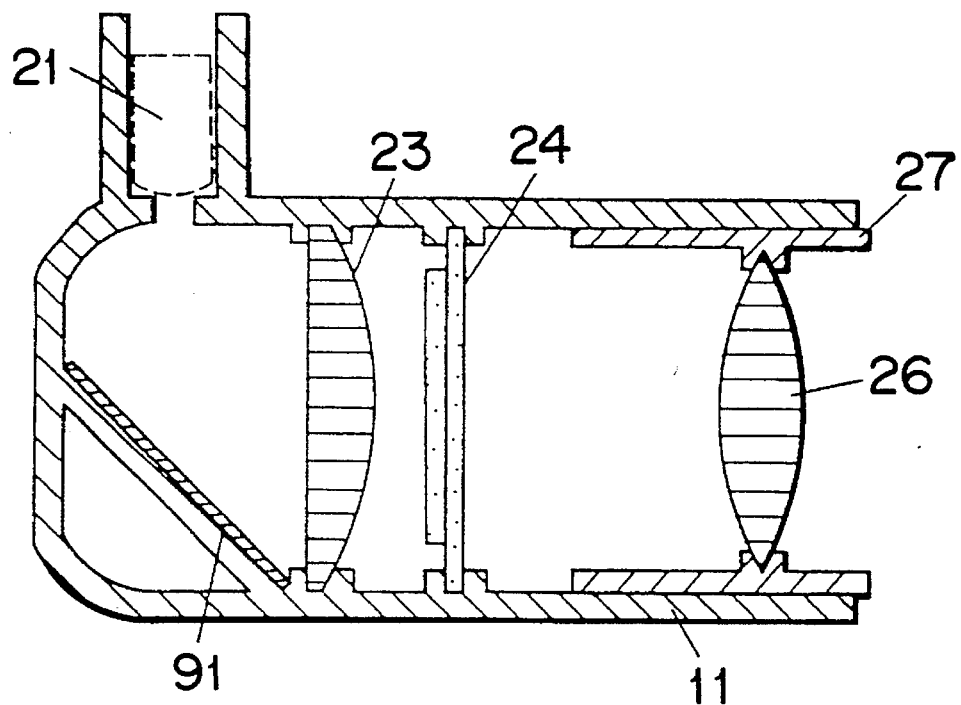
Figure 10:
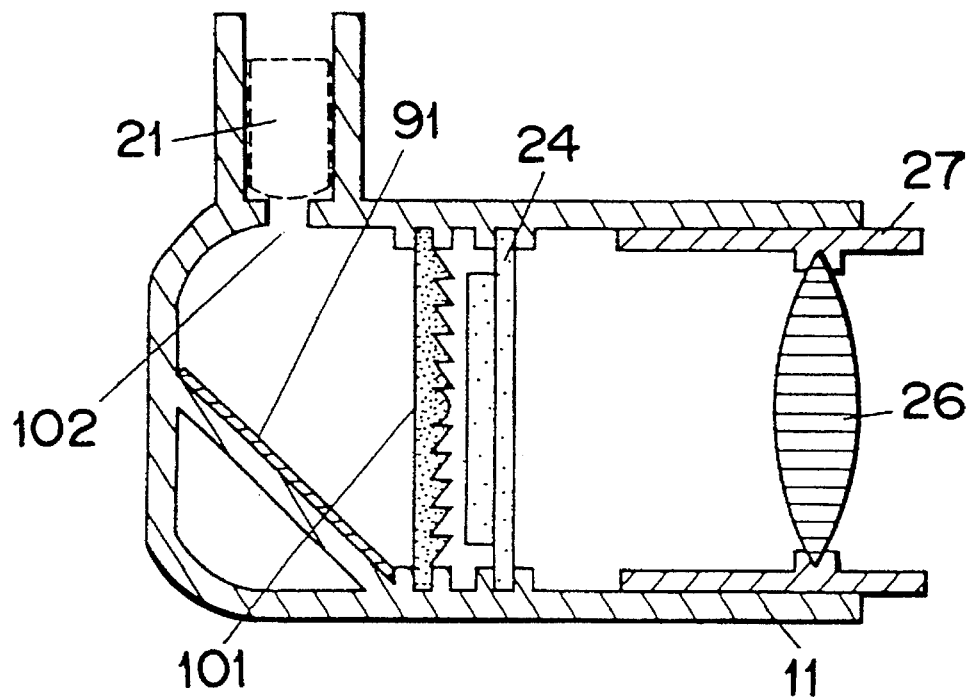
Figure 11:
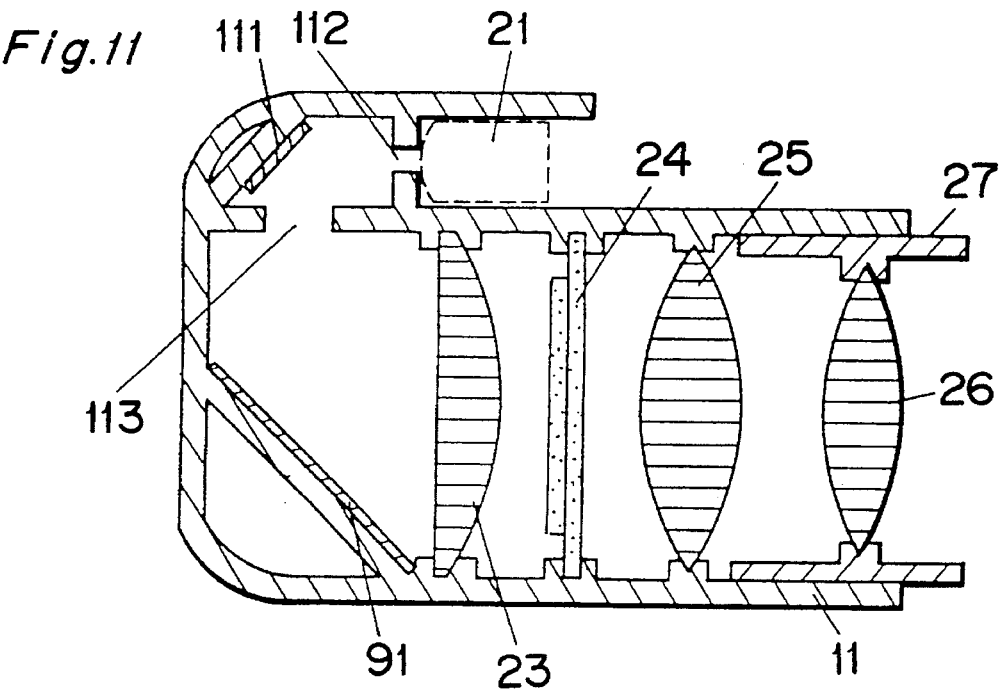

However, where the image being displayed by the liquid crystal display device 24 is viewed while the rays of light are incident thereon in a slantwise direction as shown in FIG. 8, there is an angle at which the amount of the scattered rays of light is larger than that of the rays of light passing through the liquid crystal display device 24. This phenomenon occurs generally when the angle θ of inclination is on the order of a few degrees. Although the structure shown in FIG. 8 may render the displayed image to be darker than that afforded by the structure of any one of FIGS. 2 to 7, the selection of the angle θ of inclination makes it possible to provide a favorable contrast. Since the position of the viewer's eye relative to the viewfinder is fixed during the viewing of the displayed image as hereinbefore discussed, it is easy to adjust the angle θ of inclination so that the displayed image can be viewed at an optimum condition.

Where the length of the viewfinder is desired to be reduced, the viewfinder may be constructed as shown in any one of FIGS. 9 to 11. Referring first to FIG. 9, the rays of light emitted from the light emitting element 21 are deflected 90 degree by a reflecting mirror 91 so as to travel towards the condenser lens 23. That portion of the viewfinder housing 11 where the light emitting element 21 is accommodated is adapted to be inserted into a video camera body. In other words, a variable structure is constructed so that the positive lens 26 can have its face adjustable .in a horizontal direction or a vertical direction about a longitudinal axis defined by that portion of the viewfinder housing 11 where the light emitting element 21 is accommodated. In such case, the image displayed by the liquid crystal display device 24 can be viewed from above or from horizon as adjusted by the viewer.

In the example shown in FIG. 11, a further reduction in length of the viewfinder is possible if arrangement is made so that the rays of light from the light emitting element 21 can be deflected twice by reflecting mirrors 111 and 91 so as to travel towards the condenser lens 23. It is to be noted that reference numerals 112 and 113 represent respective round holes.

While the condenser lens 23 has been shown and described as employed in the form of a plano-convex lens, it may be replaced with a Fresnel lens 101 as shown in FIG. 10 where the number of the pixels of the liquid crystal display device 24 is relatively small or where no high quality image display is required. The use of the Fresnel lens 101 makes it possible to reduce the distance between the Fresnel lens 101 and the liquid crystal display device 24 and, hence, the length of the viewfinder as a whole can be reduced. Similarly, the positive lens 26 may also be replaced with a Fresnel lens.

According to the present invention, other changes and modifications of the viewfinder embodying the present invention can readily be understood by those skilled in the art. By way of Example, the adjustable aperture 31 and the diffraction grating 81 may be added to the viewfinder of FIG. 9. Similarly, the condenser lens 23 may be replaced with the Fresnel lens. Accordingly, such changes and modifications should be construed as included with in the scope of the present invention.

The use of a light emitting element, as will subsequently be described, for the light emitting element 21 is effective to accomplish a high contrast image display at a high luminance and a color temperature adjustment. Hereinafter, the light emitting element advantageously employed in the viewfinder according to the present invention will be discussed.

Figure 17A:
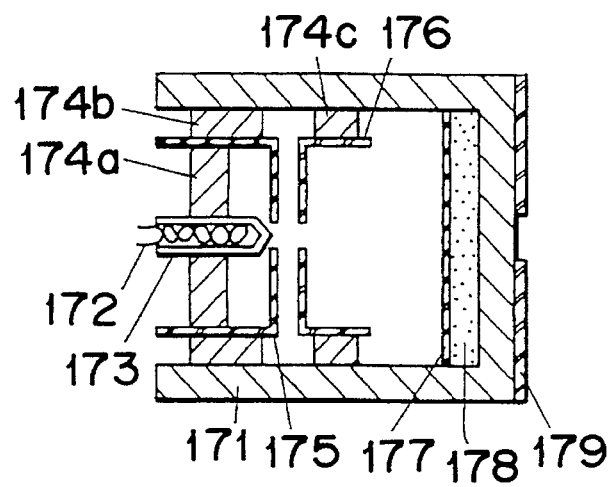
FIG. 17(a) is a schematic longitudinal sectional view of a cathode ray tube which may be employed as the light emitting element in the viewfinder of the present invention.

An example of a cathode ray tube that can be used in the viewfinder according to the present invention is shown in FIG. 17(a). In FIG. 17(a), reference numeral 171 represents an evacuated envelope made of glass; 172 represents a heater; and reference numeral 173 represents a cathode disposed around the heater 172 and made of material containing, as a main component, barium oxide. Reference numeral 175 and 176 represent respective grids. Reference numerals 174a, 174b and 174c represents respective holders for supporting the cathode 173 and the grids 175 and 176. Reference numeral 178 represents a phosphor-deposited layer, and reference numeral 177 represents an aluminum film of 0.02 to 0.2 μm in thickness which covers a surface of the phosphor-deposited layer 178. Since the phosphor-deposited layer 178 is an electrically insulating material, an injection of electrons of negative charge as a result of an impingement of electron beams causes the phosphor-deposited layer to accumulate negative charge with a potential thereof consequently lowered and, therefore, even if the anode voltage is increased, the potential at the phosphor-deposited layer will no longer increase and, hence, the brightness no longer increase. The aluminum film 177 is effective to remove the negative charge built up on the phosphor-deposited layer thereby to avoid any possible lowering of the effective accelerated voltage. Accordingly, the electron beams can be satisfactorily accelerated so that the light emitting luminance of the phosphor-deposited layer 178 can be increased. Also, since the aluminum film 177 serves as a mirror relative- to the incoming light and therefore reflects the entire amount of the rays of light travelling towards the interior of the cathode ray tube, the luminance can be increased. In addition, a negative ion burning can also be avoided.

Reference numeral 179 represents a thin film made of metal having an aperture of a small surface area defined therein for passage of rays of light. This light shielding film 179 is effective to form a favorable point light source. The cathode ray tube employed in the viewfinder of the present invention does not require a scanning of electron beams and, therefore, no deflection yoke is equipped. The phosphor material for the phosphor-deposited layer 178 may be a mixture of ZnS and Ag for blue color representation or ZnCdS and Ag for yellow color representation so far as the black-and-white image display is concerned.

Figure 15A:
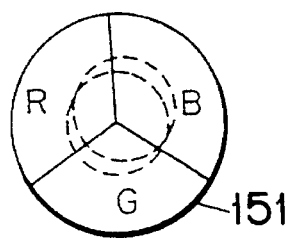
FIGS. 15(a) and 15(b) are schematic plan views showing a phosphor-deposited faces of the viewfinder light emitting element.
Figure 15B:
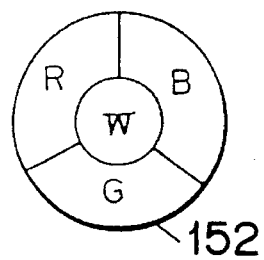

The phosphor material may be disposed in a pattern shown in any one of FIGS. 15(a) and 15(b). So far shown in FIG. 15(a), the phosphor-deposited region is divided into three areas in which red, blue and green phosphor elements are deposited respectively. A blue color of the phosphor-deposited layer is attributable to zinc sulfate (including silver) and a green color thereof is attributable to mixed crystal sulfide (including copper and aluminum). A rare earth phosphor material (oxidized yttrium sulfide or yttrium oxide mixed with europium) is an example thereof. The phosphor-deposited layer has a light emitting surface area of a diameter not greater than 10 mm. The electron beams are radiated to a position where a white balance of the emitted light color can be secured.

In the example shown in FIG. 15(b), the phosphor-deposited layer includes a central area where a white phosphor element are painted and three surrounding areas where red, blue and green phosphor elements are painted, respectively. The electron beams are designed to be radiated towards an area where three colors are mixed or towards the white phosphor-deposited area. Unless the white balance can be secured, the position at which the electron beams are radiated is adjustably moved as shown by the circle depicted by the dotted line in FIG. 15(a).

The cathode ray tube of the above described design has no deflection yoke generally used to deflect the passage of the electron beams for scanning the latter. Accordingly, the structure thereof is extremely simple. Also, since the distance between the phosphor-deposited layer and the cathode is very small, a required drive voltage may be low.

The operation of the cathode ray tube will now be described when the cathode 173 is heated by the heater 172, thermions are emitted therefrom. The thermions so emitter become electron beams due to a potential difference relative to the grids, which beams are subsequently accelerated so as to impinge upon the phosphor-deposited layer 178 to cause the latter to emit light. The light so emitted forms a divergent bundle of rays of light.

Figure 17C:
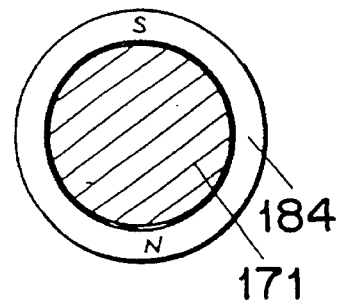
FIG. 17(c) is a schematic transverse sectional view of the cathode ray tube shown in FIG. 17(b)
Figure 17B:
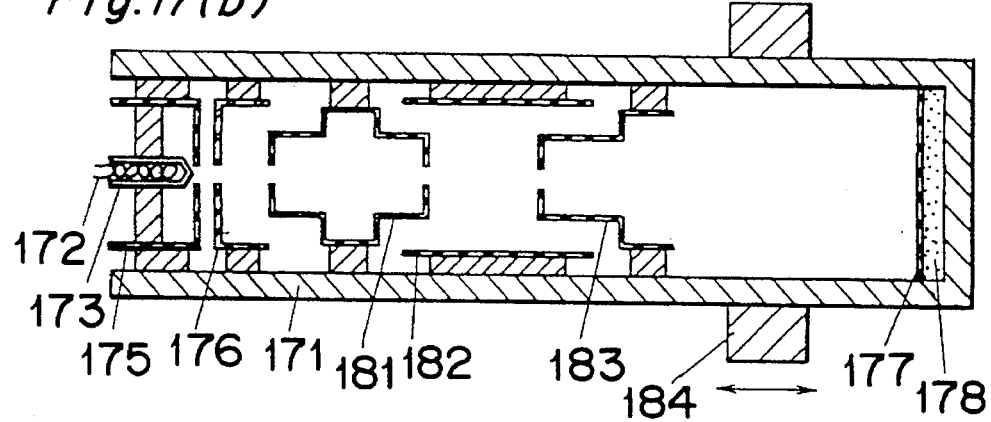
FIG. 17(b) is a view similar to FIG. 17(a), showing a modification thereof.

The cathode ray tube may have the beam converging grids arranged in a manner as shown in FIG. 17(b). In the cathode ray tube shown in FIG. 17(b), third to fifth grids 181, 181 and 183 for converging the electron beams are employed. These grids serves as a main electron converging lens operable to converge the electron beams at the phosphor-deposited layer. Because of the use of the grids described above, the cathode ray tube can form an ideal point light source. It is to be noted that an electrostatic converging system may not be always limited to a unipotential type as shown in FIG. 17(b), but may be a bipotential type. Also, it may not be always limited to the electrostatic converging system, but may be an electromagnetic converging system.

For moving the position of the electron beams radiated towards the phosphor-deposited layer, a magnet is employed. In FIG. 17(b), the magnet is identified by 184 and is in the form of a generally cylindrical magnet as shown in FIG. 17(c). This cylindrical magnet 184 is of a size capable of being mounted on the cathode ray tube and rotatable therearound. Although not shown, after the adjustment by rotation thereof, the cylindrical magnet 184 can be fixed in position by means of an adjustment mechanism. This cylindrical magnet 184 serves to generate a magnetic field in a direction generally perpendicular to the electron beams. The rotation of the cylindrical magnet 184 can deflect the electron beams under the influence of the magnetic force developed thereby. By way of example, when the electron beams is radiated to the position shown by the dotted line a in FIG. 15(a), an adjustment of the cylindrical magnet 184 can result in a shift of the electron beam to the position shown by the dotted line b. Also, by moving the position of the cylindrical magnet 184 in a direction parallel to the cathode ray tube, the amount of offset can be varied. In other words, the white balance can be freely varied. It is to be noted that the use of the cylindrical magnet can be equally applicable to the arrangement of the color phosphor elements as shown in FIG. 15(b).

The adjustment of the white balance can also be accomplished by the use of a plurality of cathodes. By way of example, respective cathodes may be employed for the red, green and blue phosphor elements shown in FIGS. 15(b). In this example, the electron beams emitted from the respective cathodes can impinge on the associated phosphor elements to emit rays of light. In order to form the point light source, it is preferred that the electron beams are as close as possible. The white balance of the color of the emitted light can be adjusted by controlling a voltage to be applied to each of the cathodes.

Figure 16A:
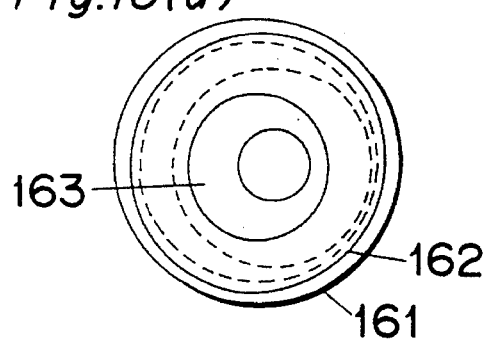
FIGS. 16(a) to 16(b) are schematic plan and sectional views of a light shielding member used in connection with the viewfinder light emitting element according to the present invention, respectively.
Figure 16B:
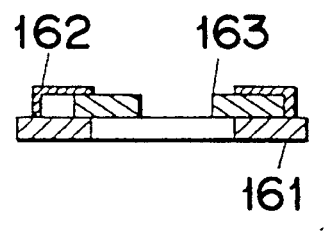

In order to form the point light source, other than the formation of the light shielding film 179 as shown in FIG. 17(a), a slide as will be described later may be fitted to a glass faceplate as shown in FIGS. 16(a) and 16(b). FIG. 16(a) is a plan view of the slide and FIG. 16(b) is a sectional view of the slide. Reference numeral 161 represents a cover adapted to be inserted at a front end of the glass faceplate of the cathode ray tube. Reference numeral 163 represents a slide plate having a through-hole defined at a central portion thereof and sandwiched between a support 162 and a cover 161. The slide plate 163 can be offset eccentrically by the application of an external force thereto and, accordingly, the position of the through-hole can be adjusted. Where the phosphor-deposited layer 178 is of a color arrangement as shown in FIG. 15(a) or that as shown in FIG. 15(b), this function of the slide plate is effective. In other words, if the light emitting area is chosen to be larger than the diameter of the through-hole in the slide plate 163 and the slide plate 163 is eccentrically positioned, the white balance of the emitting light can be adjusted.

Figure 14A:
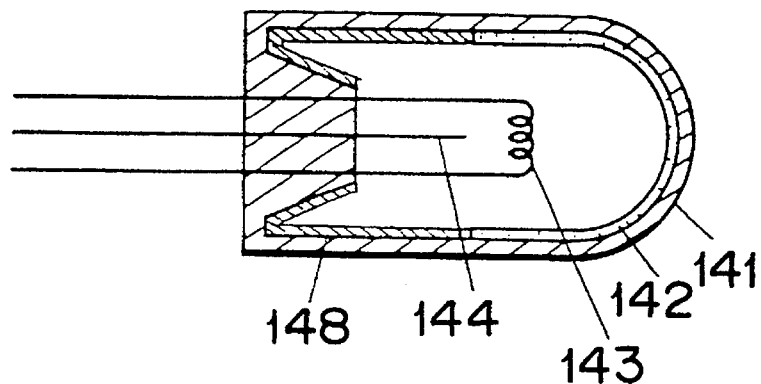
FIGS. 14(a) to 14(c) are schematic views of light emitting tubes which may be employed in the viewfinder of the present invention, respectively.
Figure 14B:
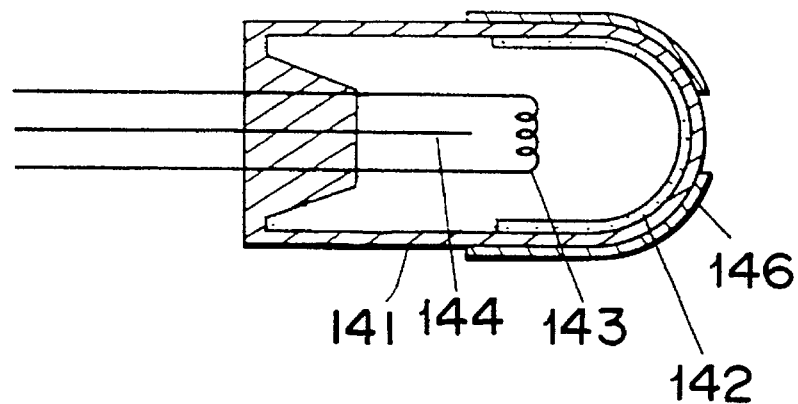
Figure 14C:
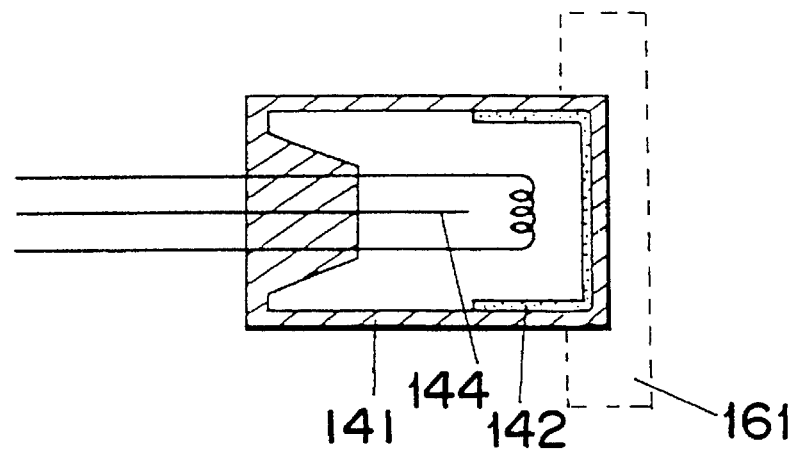

The light emitting tube employed in the viewfinder will now be described. As shown in FIG. 14(a)–14(c), the light emitting tube has an outer appearance similar to a miniature lamp bulb. Reference numeral 141 represents a casing made of glass and having a diameter within the range of 5 to 20 mm. Reference numeral 143 represents a filament which can be heated by the application of a voltage of about 2.5 to 8 volts. Reference numeral 144 represents an anode to which a voltage of about 10 to 25 volts is applied. The electrons emitted as a result of the heating of the filament 14 can be accelerated by the applied anode voltage. The casing 141 is filled with mercuric molecules (not shown) so that, when the accelerated electrons collide with the mercuric molecules, ultraviolet rays of light can be emitted. This ultraviolet rays of light subsequently excite the phosphor-deposited layer 142 to cause the latter to emit visible rays of light. Reference numeral 148 represents a reflector film made of metal and serving to reflect the rays of light, emitted from the phosphor-deposited layer 142, thereby to improve an efficiency of radiating the rays of light towards the front. Although the reflector film 148 has been shown as formed on an inner surface of the casing 141, the present invention is not always limited thereto and it may be formed on an outer surface of the casing 141. Also, as shown in FIG. 14(b), the preferred point light source can also be formed by providing an outer surface of the casing 141 with a light shielding film 146 having a round perforation defined at a central portion thereof.

The phosphor-deposited layer 142 may be a mixture of blue and yellow phosphor material for the white display as is the case with the cathode ray tube. Also, as shown in FIGS. 15(a) and 15(b), the phosphor-deposited layer may comprise three divided areas for the red, blue and green color phosphor material, respectively.

If the slide cover 161 is fitted while the phosphor-deposited layer is formed as shown in FIG. 15(a) or as shown in FIG. 15(b), the color temperature of the radiated light can be adjusted.

The drive can be accomplished by means of a pulse drive and, in such case, the amount of light radiated can be adjusted. The frequency of the pulse is preferred to be equal to or higher than 30 Hertz and, preferably equal to or higher than 60 Hertz. If the voltage to be applied to the anode is chosen in the form of a pulse signal, the amount of light radiated can be varied in proportion to the width of the pulse signal. When the pulse width is 1/2, a sufficient luminance can be obtained in the image displayed by the liquid crystal display device of 28 mm in diagonal length and, at this time, the amount of electric power consumed by the light emitting tube of the present invention has been found 0.25 watt including that consumed by the filament. The luminance obtained by this light emitting tube has been found to be about 800 (ft-L).

Figure 13A:
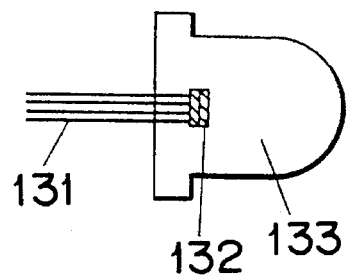
FIG. 13(a) is a schematic sectional view of a light emitting diode employed in the viewfinder of the present invention.

Hereinafter, the light emitting diode used in the viewfinder embodying the present invention is described below. The structure of the light emitting diode is shown in FIG. 13(a). In FIG. 13(a), reference numeral 133 represents a resinous lens; 132 represents a light emitter; and reference numeral 131 represents terminals. The light emitter is made of red, green and blue light emitting chips and is provided with a common terminal and four terminals connected with the respective light emitting chips. The three light emitting chips are molded in a transparent synthetic resin. Each of these light emitting chips is molded in closely neighboring fashion in an appropriate number required for the light emitting chips to emit a white light.

The color of the rays of light emitted from the light emitting diode can be adjusted by controlling a voltage or an electric current to be applied to each of the red, green and blue light emitting chip. Equally, the color temperature of the image displayed by the liquid crystal display device 24 can also be adjusted by controlling the voltage or electric current to be applied to the light emitting chips. This adjustment of the color temperature is very easy as compared with the case in which the backlighting is employed.

Figure 13B:
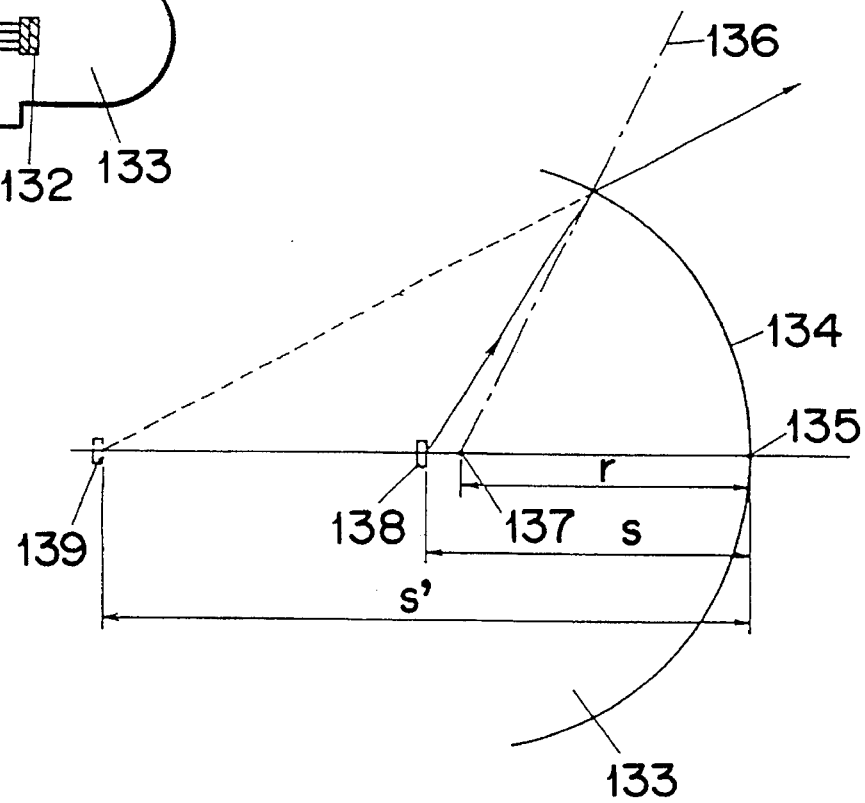
FIG. 13(b) is a schematic diagram showing a geometry of the light emitting diode shown in FIG. 13(a)

A surface of the molding resin for the light emitting diode can be use as a lens. In particular, as shown in FIG. 13(b), the surface of the molding resin is made spherical so that the rays of light emitted from the light emitter can satisfy an aplanatic condition. Assuming that the lens surface of the molding resin has a radius of curvature expressed by r and an index of refraction expressed by n, the light emitter 138 should be disposed at a position spaced from an apex 135 of the lens surface a distance S which is equal to $(1+1/n) \cdot r$. In such case, an image of the light emitter 138 formed by the lens surface 184 is formed at a position 139 spaced from the apex 135 of the lens surface a distance S' which is equal to $(1+n) \cdot r$. Since the light emitter 138 is of a size sufficiently small as compared with the diameter of the condenser lens, it can be regarded as a point. It is to be noted that reference numeral 137 represents the center of curvature of the lens surface 134, and reference numeral 188 represents a normal to the lens surface. If the light emitter of the light emitting diode is molded in the synthetic resin, a surface therefrom which rays of light emerge outwardly is used as a spherical lens, and the rays of light emitted from the light emitter satisfy the aplanatic condition, rays of light incident on the spherical lens from the light emitting diode satisfies the sine condition and, therefore, the uniform luminance of the liquid crystal display device as viewed by the viewer can be obtained.

Figure 18A:
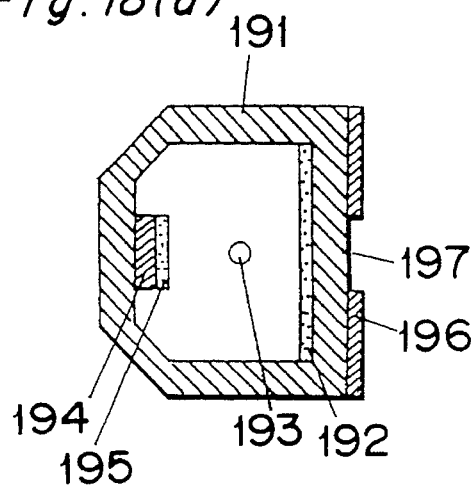
FIGS. 18(a) and 18(b) are schematic sectional views of fluorescent light emitting elements which may be employed in the viewfinder of the present invention.
Figure 18B:
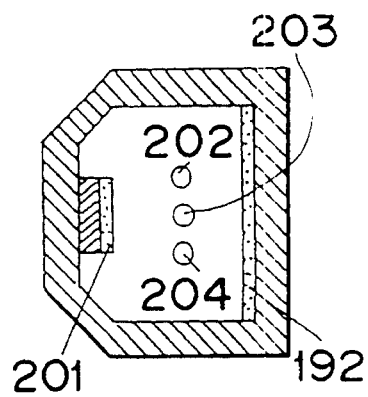
Figure 18C:
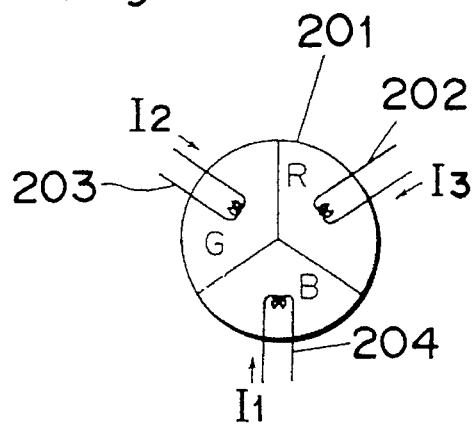
FIG. 18(c) is a schematic diagram showing the position of a cathode in the fluorescent light emitting element shown in FIG. 18(b)

A fluorescent light emitting element which may be used as the light emitting element for the viewfinder is shown in FIGS. 18(a), 18(b) and 18(c). In FIG. 18(a); reference numeral 191 represents a face glass (hereinafter referred to as a casing); reference numeral 193 represents a filament cathode (hereinafter referred to as a cathode); reference numeral 197 represents a light shielding film made of metal; reference numeral 194 represents a formed portion such as an anode; reference numeral 195 represents a phosphor-deposited layer; and reference numeral 192 represents a nesa film.

In operation, the cathode 193 is heated to a temperature of about 400° to 800° to emit thermions. The thermions so emitted are accelerated by the potential of the anode 194 and collide the anode 193 to excite the phosphor-deposited layer 195 to cause the latter to emit rays of light. The phosphor material for the phosphor-deposited layer 195 may be a mixture of ZnS and Ag for blue color representation or ZnCdS and Ag for yellow color representation so far as the white light emission is concerned. The rays of light emitted can emerge outwardly from an aperture 197 defined in the light shielding film 196 fitted to a front surface of the casing 191. The light shielding film 196 may be formed on an inner surface of the casing 191. Where the distance between the light emitting element and the condenser lens 23 is desired to be reduced, the face glass of the casing 191 may be formed as a convex lens.

An adjustment of the white balance of the rays of light emitted can be accomplished by the formation of a plurality of cathodes as shown in FIG. 18(b). The fluorescent light emitting element shown in FIG. 18(b) has three cathodes. It is to be noted that, as shown in FIG. 15(a) or FIG. 15(b), the phosphor-deposited layer 201 is divided into three areas one for each of the red, blue and green colors. The three cathodes 202, 203 and 204 are so arranged as to correspond to the phosphor elements of the respective colors. With the foregoing structure, the amount of thermions can be adjusted by means of electric currents $I_1$, $I_2$ and $I_3$ what are supplied to the respective cathodes as shown in FIG. 18(c). Accordingly, the white balance and the color temperature of the rays of light emitted by the light emitting element can be freely adjusted.

When the light emitting element of the type described hereinabove is employed as the light emitting element 21 used in the viewfinder of the present invention, a satisfactory contrast and a highly satisfactory quality of the image being displayed can be appreciated. However, the light emitting element 21 used in the practice of the present invention is not always limited to that described above and, as a white light emitting element, a light emitting tube commercially available as one of products in Lunapastel series manufactured by Minipllo Electric Co., Ltd. of Japan (7 mm and 10 mm in diameter), or a cold cathode fluorescent tube commercially available as Model Number 5-C21T26E85H manufactured by Matsushita Electric Industrial Co., Ltd. of Japan can be equally employed. Where the above mentioned fluorescent tube or the cold cathode fluorescent tube is employed, the use is to be made of a light shielding plate so that the rays of light can be emitted through a minute region or area before it is actually incorporated in the viewfinder according to the present invention.

Figure 21:
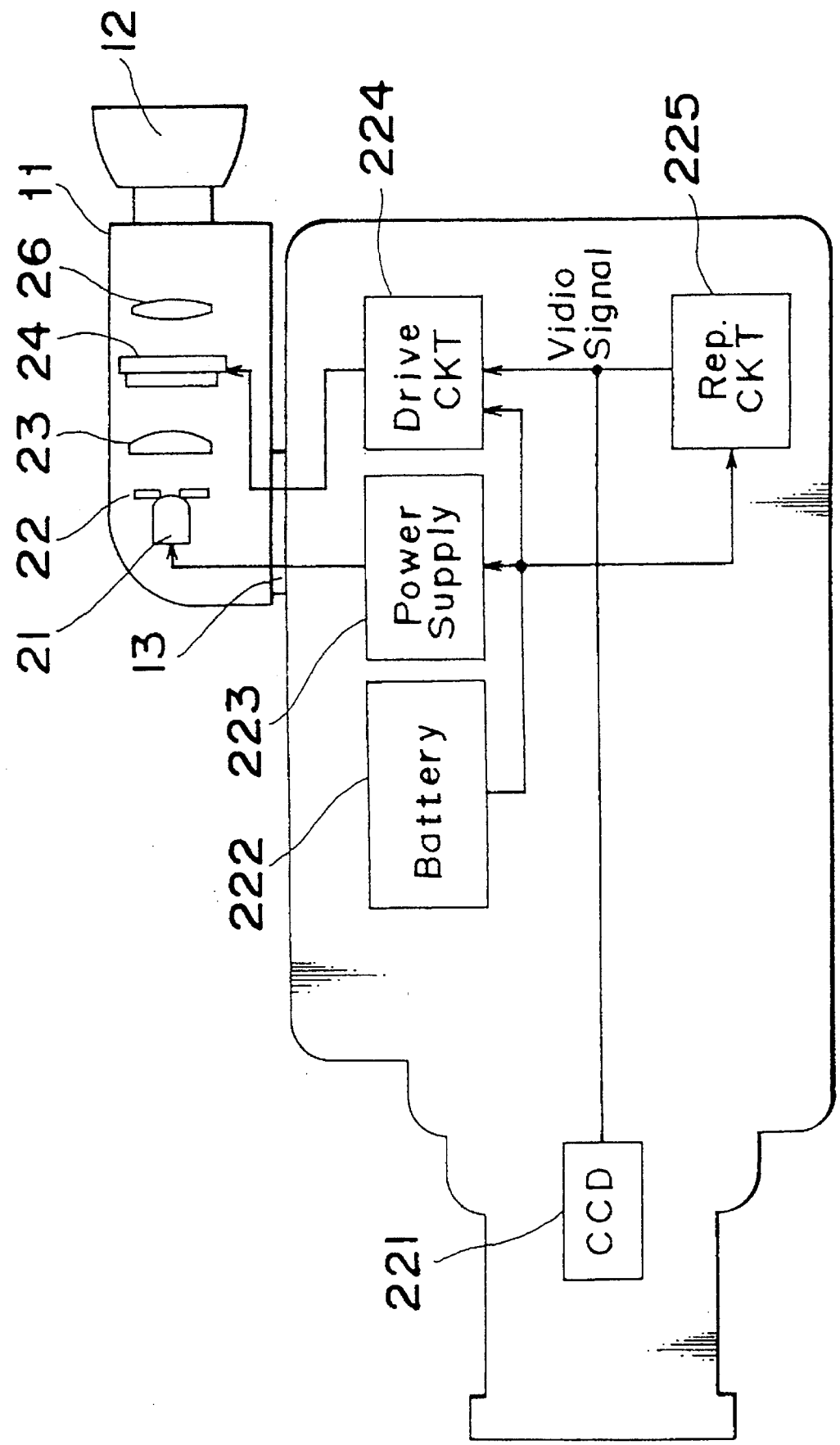
FIG. 21 is a circuit block diagram showing a video camera on which the viewfinder of the present invention can be mounted.

FIG. 21 illustrates a video camera on which the viewfinder according to the present invention is mounted. The viewfinder housing 11 has a mounting foot 13 secured thereto and adapted to be engaged in a hot shoe rigid or fast on the video camera body. The liquid crystal display device 24 shown therein is of a type referred to as a polymer dispersed liquid crystal display panel having a screen size of about 28 mm (1.1 inch) in diagonal length. Reference numeral 224 represents a liquid crystal panel drive circuit shown in FIG. 20.

For the light emitting element 21, the light emitting element (Lunapastel-07 series) manufactured by Minipilo Electric Co., Ltd. was employed, having a diameter of 7 mm and capable of emitting white light. A voltage is supplied to the light emitting tube from a tube electric power supply circuit 223. This power supply circuit 223 supplies a heater voltage of 2.5 volt and an anode voltage of 18 volts to the light emitting tube 21. A tube voltage circuit includes a circuit for converting the anode voltage into a pulse signal of 60 Hertz in frequency. The use of the pulse signal as the voltage to be applied to the anode makes it possible to vary the amount of light emitted in proportion to the width of the pulse signal. The proportion of the pulse width can be continuously adjusted from zero to 1/1 by rotating a volume knob provided on the video camera body. When the pulse width is 1/2, the luminance of the light emitting tube will be about 800 (ft-L) and, when it is 1/1, that is, when the anode voltage is continuously applied, the luminance will be 1,600 (ft-L) which is twice that at 1/2. It has been found that, when the luminance of the light emitting tube was 800 (ft-L), the amount of electric power consumed by the light source was about 0.25 watt. On the other hand, the video signal is outputted from a CCD sensor 221 to the Video amplifier 211 of the liquid crystal drive circuit 224 so that an image can be subsequently displayed by the liquid crystal display panel 24.

A video signal recorded on a length of video tape can be reproduced by a reproducing circuit 225 and is subsequently amplified by the video amplifier 211. Reference numeral 222 represents a battery replaceably fitted to the camera body and for supplying therefrom a necessary electric power to the tube power supply circuit 223, the liquid crystal drive circuit 224 and the reproducing circuit 225. While the amount of electric power consumed in the prior art viewfinder in which the TN liquid crystal panel is employed was about 1.0 watt, the amount of electric power consumed in the viewfinder of the present invention was about 0.3 watt which is about one third of that of the prior art viewfinder.

From the foregoing description, it is clear that in the viewfinder embodying the present invention the rays of light emitted at a relatively large solid angle from a minute light emitter of the light emitting element are converted by the condenser lens into a bundle of generally parallel rays of light having a narrow directionality which are subsequently modulated by the liquid crystal display device to display an image. Accordingly, the viewfinder of the present invention consumes a reduced amount of electric power and is substantially free from any variation in luminance. Moreover, as compared with the prior art viewfinder wherein the backlighting is employed, the drive circuit for the light emitting element may be simple in structure and, therefore, the viewfinder embodying the present invention can be compact in size and lightweight. Where the polymer dispersed liquid crystal display device is employed for the liquid crystal display device, the amount of electric power consumed can further be reduced as compared with the viewfinder wherein the TN liquid crystal display device is employed.

Also, the white balance and the color temperature of the rays of light emitted therefrom can readily be adjusted by the voltage to be applied to the red, green and blue phosphor elements where the light emitting diode is employed for the light emitting element, or by the magnetic force of the cylindrical magnet where the cathode ray tube is employed for the light emitting element, or by moving the hole in the slide where the light emitting tube is employed for the light emitting element. Yet, the intensity of light emitted can be adjusted by the voltage or the electric current to be applied to the light emitting element. This intensity adjustment can also be accomplished by the use of the aperture 31.

Furthermore, since the viewfinder of the present invention requires a minimized consumption of electric power, and if it is mounted on the video camera, the length of time during which the video camera can be continuously run can advantageously be prolonged.

Although the present invention has been described connection with preferred embodiments thereof with reference to the accompanying drawings, it is to be noted that various changes and modifications are apparent to those skilled in the art. Such changes and modifications are to be construed as being included within the scope of the present invention as defined by the appended claims unless they depart therefrom.

What is claimed is:

1. A viewfinder which comprises:

a liquid crystal display panel having a predetermined area of an image display surface;

a light condenser having a focal point; and a light generator having a light emitting surface having a smaller area than said predetermined area of said image display surface of said liquid crystal display panel, said light generator being disposed by said area of said light emitting surface located at or near said focal point of said light condenser;

said condenser being operable to collect white light rays emitted from said light emitting surface so as to illuminate said image display surface of said liquid crystal panel, and said liquid crystal display panel being operable to modulate the white light rays, emerging outwardly from said condenser, based on a video signal.

2. A viewfinder which comprises:

a liquid crystal display panel of a dot-matrix type having a predetermined area of an image display surface;

a light condenser having a focal point;

a light generator including a fluorescent element for generating white light rays and having a light emitting surface having a smaller area than said predetermined area of said image display surface of said liquid crystal display panel, said light generator being disposed by said area of said light emitting surface located at or near said focal point of said light condenser; and a magnifier for magnifying an optical image of said liquid crystal display panel to present it to a viewer;

said condenser being operable to convert the white light rays emitted from said light emitting surface into parallel light rays and then to illuminate said image display surface of said liquid crystal panel, said liquid crystal display panel being operable to modulate the white light rays, emerging outwardly from said condenser, based on a video signal.

3. A viewfinder which comprises:

a liquid crystal display panel of a dot-matrix type having a predetermined area of an image display surface;

a light generator for emitting white light rays by irradiating a fluorescent substance with ultraviolet light rays;

a light condenser for converting the light rays from the light generator into parallel light rays and including at least one convex lens and having first and second lens surfaces opposite to each other and confronting said light generator and said liquid crystal display panel, respectively, said first lens surface having a radius of curvature which is greater than that of said second lens surface; and a magnifier for magnifying an optical image of said liquid crystal display panel to present it to a viewer;

said liquid crystal display panel being operable to modulate the white light rays, emerging outwardly from said condenser, based on a video signal.

4. A viewfinder which comprises:

a liquid crystal display panel having a predetermined area of an image display surface;

a light condenser having a focal point;

a light generator having a light emitting surface having a smaller area than said predetermined area of said image display surface of said liquid crystal display panel, said light generator being disposed by said area of said light emitting surface located at or near said focal point of said light condenser;

said condenser being operable to collect white light rays emitted from said light emitting surface so as to illuminate said image display surface of said liquid crystal panel, said liquid crystal display panel being operable to modulate the white light rays, emerging outwardly from said condenser, based on a video signal.

5. A viewfinder which comprises:

a light emitter including a casing containing a fluorescent substance and mercury molecules and a heater, said light emitter operable to emit visible light rays when electrons generated by said heater act on said mercury molecules contained within said casing to generate ultraviolet light rays and when the ultraviolet light rays so generated subsequently illuminate said fluorescent substance contained within said casing;

a light condenser for converting the light rays from said light emitter into parallel light rays; and a liquid crystal display panel of a dot-matrix type for modulating the light rays emerging outwardly from said condenser.

6. The viewfinder as claimed in claim 5, further comprising a light reflector disposed on at least one of inner and outer surfaces of said casing and at a location other than a light emitting surface thereof.

7. The viewfinder as claimed in claim 5, wherein said condenser includes at least one convex lens having first and second lens surfaces opposite to each other, said convex lens confronting said light generator and said liquid crystal display panel, respectively, said first lens surface having a radius of curvature which is greater than that of said second lens surface.

8. The viewfinder as claimed in claim 5, wherein said liquid crystal display panel is an active matrix type liquid crystal display panel having a mosaic pattern of color filters and also having a plurality of switching elements one for each pixel.

9. The viewfinder as claimed in claim 5, wherein the light emitting means has a light emitting surface which is flat.

10. The viewfinder as claimed in claim 5, wherein said condenser is a Fresnel lens.

11. The viewfinder as claimed in claim 5, wherein an area of emission of light of the light emitter which is collected by said condenser is not greater than 15 mm$^2$.

12. A viewfinder which comprises:

a light emitter including a casing containing a fluorescent substance and mercury molecules and a heater, said light emitter operable to emit visible light rays when electrons generated by said heater act on said mercury molecules contained within said casing to generate ultraviolet light rays and when the ultraviolet light rays so generated subsequently illuminate said fluorescent substance contained within said casing;

a light condenser for converting the light rays from said light emitter into parallel rays of light;

a liquid crystal display panel of a dot-matrix type for modulating the light rays emerging outwardly from said condenser.

13. A viewfinder which comprises:

a light emitter including a casing containing a fluorescent substance and mercury molecules and a heater, said light emitter operable to emit visible light rays when electrons generated by said heater act on said mercury molecules contained within said casing to generate ultraviolet light rays and when the ultraviolet light rays so generated subsequently illuminate said fluorescent substance contained within said casing;

a light condenser for converting white light rays emitted from said light emitter into parallel light rays;

a liquid crystal display panel of a dot matrix type having color filters for modulating the light rays emerging outwardly from said condenser; and a magnifier for magnifying an optical image of said liquid crystal display panel to present it to a viewer;

said condenser including at least one convex lens having first and second lens surfaces opposite to each other and confronting said light generator means and said liquid crystal display panel, respectively, said first lens surface having a radius of curvature which is greater than that of said second lens surface.

14. The viewfinder as claimed in claim 13, wherein said liquid crystal display panel is a polymer dispersed liquid crystal display panel having a layer of polymer dispersed liquid crystal, said layer having a thickness within a range of 5 to 30 μm, said polymer dispersed liquid crystal containing liquid crystal droplets and a polymer, an average particle size of said liquid crystal droplets or a diameter of holes in a polymer network contained therein being within a range of 0.5 to 3.0 μm.

15. The viewfinder as claimed in claim 13, wherein said heater is a filament and has an anode for applying an electric field to electrons generated by said filament.

16. The viewfinder as claimed in claim 13, further comprising a light reflector disposed on at least one of inner and outer surfaces of said casing and at a location other than a light emitting surface thereof.

17. The viewfinder as claimed in claim 13, further comprising an aperture disposed within said light generator and said condenser for shielding unnecessary light.

18. A viewfinder which comprises:

a light emitter including a casing containing a fluorescent substance and mercury molecules and a heater, said light emitter operable to emit visible light rays when electrons generated by said heater act on said mercury molecules contained within said casing to generate ultraviolet light rays and when the ultraviolet light rays so generated subsequently illuminate said fluorescent substance contained within said casing;

a light condenser for converting white light rays emitted from said light emitter into parallel light rays;

a liquid crystal display panel of a dot-matrix type having color filters for modulating the light rays emerging outwardly from said condenser; and a magnifier for magnifying an optical image of said liquid crystal display panel and presenting a magnified virtual image to a viewer.

19. A viewfinder which comprises;

a light emitter including a light emitting diode having a molded resin, said molded resin having a plurality of chips molded therein for generating red, blue and green light;

an adjuster for adjusting a white balance of light emerging outwardly from said molded resin by controlling an electric current or voltage applied to said plurality of chips;

a light condenser for converting the light from said light emitter into a bundle of light rays of a narrow directionality;

a liquid crystal display panel of a dot-matrix type for modulating light emerging outwardly from said light condenser; and a magnifier for magnifying an optical image of said liquid crystal display panel and presenting a magnified virtual image to a viewer.

20. The viewfinder as claimed in claim 19, wherein said condenser is a Fresnel lens.

21. The viewfinder as claimed in claim 19, wherein said liquid crystal display panel is a polymer dispersed liquid crystal display panel having a layer of polymer dispersed liquid crystal, said layer having a thickness within a range of 5 to 30 μm, said polymer dispersed liquid crystal containing liquid crystal droplets and a polymer, an average particle size of said liquid crystal droplets or a diameter of holes in a polymer network contained therein being within a range of 0.5 to 3.0 μm.

22. The viewfinder as claimed in claim 19, wherein said chips are molded in said molded resin having a light emitting surface which is spherical, said spherical light emitting surface having an apex spaced a distance of $(1+1/n)\cdot\gamma$ from said light emitter, wherein γ represents a radius of curvature of said spherical light emitting surface, and n represents an index of refraction of said resin.

23. A video camera which comprises a viewfinder and an image taker, said viewfinder comprising:

a light emitter including a light emitting diode having a molded resin, said molded resin having a plurality of chips molded therein for generating red, blue and green light;

an adjuster for adjusting a while balance of light emerging outwardly from said molded resin by controlling an electric current or voltage applied to said plurality of chips;

a light condenser for converting light from said light emitter into a bundle of light rays of a narrow directionality;

a liquid crystal display panel of a dot-matrix type for modulating light emerging outwardly from said light condenser; and a magnifier for magnifying an optical image of said liquid crystal display panel and presenting a magnified virtual image to a viewer.

24. A viewfinder which comprises:

a light generator;

a light condenser for converting light rays emitted from said light generator into parallel rays of light;

a polymer dispersed liquid crystal display panel for modulating light rays emerging outwardly from said light condenser; and a magnifier for magnifying an optical image of said liquid crystal display panel and presenting a magnified virtual image to a viewer, said magnifier having an optical axis which is aligned with a normal passing through a center of an image area of said liquid crystal display panel;

said light rays from said light condenser being incident upon said liquid crystal display panel slantwise relative thereto.

25. A video camera which comprises a viewfinder and an image taker, said viewfinder comprising:

a light generator;

a light reflector for bending light rays emitted from said light generator;

a light condenser for converting light rays reflected by said reflector into parallel light rays;

a liquid crystal display panel of a dot-matrix type for modulating light rays emerging outwardly from said light condenser;

a magnifier for magnifying an optical image of said liquid crystal display panel and presenting a magnified virtual image to a viewer.

26. The video camera as claimed in claim 25, wherein a light emitting element forming a part of said light generator is mounted in a camera body of a video camera for pivotal movement about a portion where said light emitting element is mounted.

\* \* \* \* \*